(12) United States Patent
Kihara et al.

(10) Patent No.: US 8,118,503 B2
(45) Date of Patent: Feb. 21, 2012

(54) BLADE DRIVING DEVICE FOR CAMERAS

(75) Inventors: Tomokazu Kihara, Tokyo (JP); Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 12/667,127

(22) PCT Filed: Jun. 26, 2008

(86) PCT No.: PCT/JP2008/061631
§ 371 (c)(1),
(2), (4) Date: Mar. 17, 2010

(87) PCT Pub. No.: WO2009/004975
PCT Pub. Date: Jan. 8, 2009

(65) Prior Publication Data
US 2010/0202770 A1    Aug. 12, 2010

(30) Foreign Application Priority Data
Jun. 29, 2007    (JP) ................................. 2007-173083

(51) Int. Cl.
*G03B 9/36*    (2006.01)
(52) U.S. Cl. ........................................ 396/483; 396/493
(58) Field of Classification Search .................. 396/493, 396/483
See application file for complete search history.

(56) References Cited

U.S. PATENT DOCUMENTS

| | | | |
|---|---|---|---|
| 6,340,252 B1 * | 1/2002 | Kawano | 396/450 |
| 7,161,745 B2 * | 1/2007 | Onishi et al. | 359/738 |
| 7,374,352 B2 * | 5/2008 | Kudo | 396/458 |
| 7,699,542 B2 * | 4/2010 | Watanabe et al. | 396/448 |
| 2004/0258405 A1 * | 12/2004 | Shiratori et al. | 396/458 |
| 2006/0024050 A1 | 2/2006 | Kudo | |

FOREIGN PATENT DOCUMENTS

| | | |
|---|---|---|
| JP | 2004-264467 | 9/2004 |
| JP | 2005-287159 | 10/2005 |
| JP | 2006-65297 | 3/2006 |
| JP | 2006-178366 | 7/2006 |
| JP | 2006178366 A * | 7/2006 |
| JP | 2006-251467 | 9/2006 |

OTHER PUBLICATIONS machine translation of JP2006-178366A.*
International Search Report issued Aug. 26, 2008 in International (PCT) Application No. PCT/2008/061631.

* cited by examiner

*Primary Examiner* — W. B. Perkey
*Assistant Examiner* — Linda B Smith
(74) *Attorney, Agent, or Firm* — Wenderoth, Lind & Ponack, L.L.P.

(57) ABSTRACT

A base plate is elongate and an opening for a photographing optical path is configured close to one end in its longitudinal direction. A shutter blade is rotatably mounted to the blade-mounting shank of the base plate so that when the opening is fully opened, a part covering the opening is stored in the region of the base plate in the longitudinal direction. Another shutter blade is slidably mounted to the blade-mounting shank of the base plate so that when the opening is fully opened, a part covering the opening is stored in the region of the base plate in its lateral direction. Each of the shutter blades is constructed so that the reciprocating operation is performed by the driving pin of an electromagnetic actuator to open and to close the opening.

11 Claims, 16 Drawing Sheets

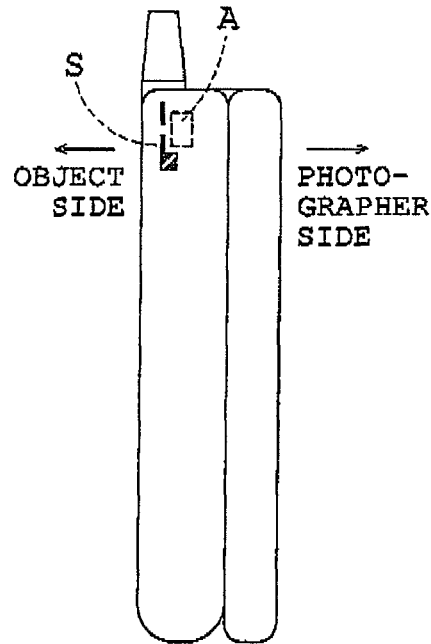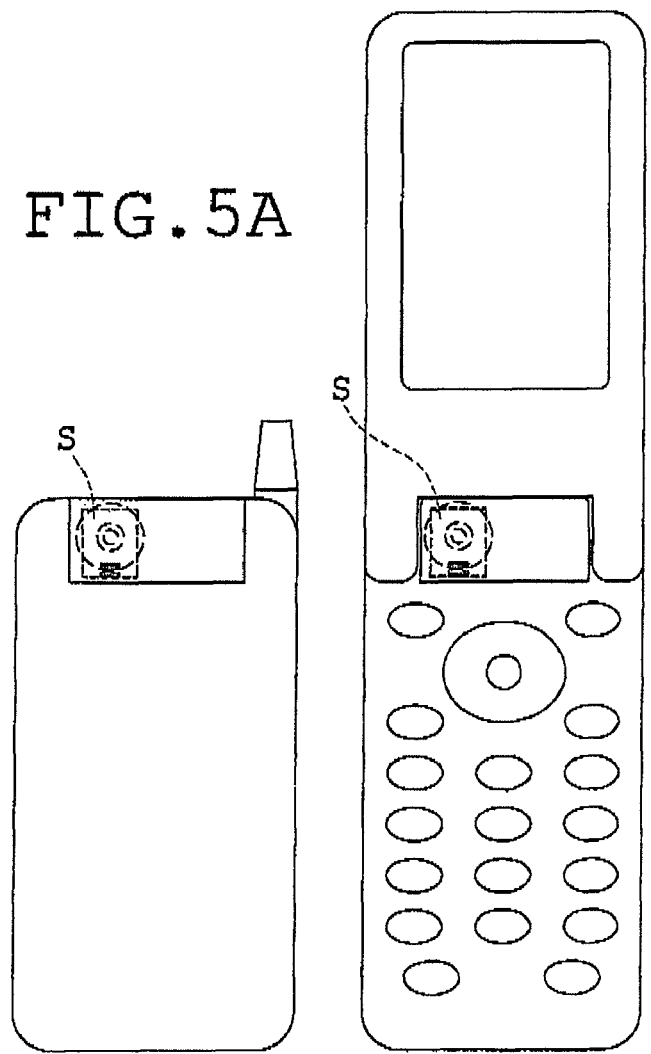

BLADE DRIVING DEVICE FOR CAMERAS

TECHNICAL FIELD

This invention relates to a blade driving device for cameras which can be used in a film camera as well as in a digital camera.

BACKGROUND ART

As blade driving devices for cameras, shutter devices, stop devices, filter devices, and lens barrier devices are known. However, it is common practice that any of these devices is located proximate to a photographic lens, with the exception of a focal plane shutter of the shutter devices. Formerly, the photographic lens has been placed at about the middle of a camera body, viewed from to the object side. Hence, as set forth in Japanese Patent Kokai No. 2004-264467, constituent members of the blade driving device can be arranged in such a way as to surround the optical axis and thus the number of degrees of design freedom is increased.

However, variously designed cameras have recently been appeared, and cameras in which the photographic lens is placed at the end or corner of the camera body, viewed from the object side, have also been appeared. Cameras incorporated in information terminals, such as mobile phones, PDAs, or PCs, are such that the photographic lens is generally placed at the end or corner of each of these terminals. However, it is very difficult that the blade driving device is constructed so that it is capable of accommodating such a placement. The maximum reason for this is that it is difficult to ensure space for the arrangement of blades where they are removed from a photographing optical path.

Under such circumstances, a shutter device of an interesting structure is disclosed in Japanese Patent Kokai No. 2005-287159. According to this reference, the shutter device is provided with two shutter blades designed so that they are reciprocated and rotated in opposite directions at the same time. A shutter base plate is nearly elongate and the two shutter blades are constructed so that each of them is rotatably mounted in a region between one end of the shutter base plate in its longitudinal direction and an opening for the photographing optical path and when an opening operation is performed, one shutter blade, although in a rotational motion, is operated toward about the longitudinal direction of the shutter base plate which is the direction of its mounting region, while the other shutter blade also, although in a rotational motion, is operated toward one region of the shutter base plate in about its lateral direction.

The shutter device constructed as mentioned above is convenient for placement in a limited-width space because the shutter base plate is nearly rectangular. In addition, it is possible that the shutter device is constructed so that a region on the opposite side of the mounting region, of the shutter blades, that is, a region between the other end of the shutter base plate in its longitudinal direction and the opening for the photographing optical path, is made small and the opening for the photographing optical path is brought close to the other end side. Hence, the shutter device constructed as mentioned above is easily used in the camera in which the photographic lens is placed at the end or corner of the camera body or the information terminal. The present invention relates to the blade driving device for cameras further developing such a structure.

DISCLOSURE OF THE INVENTION

In order to increase the number of degrees of design freedom for the entire arrangement in the single camera or the information terminal, even the blade driving device constructed like the shutter device set forth in Kokai No. 2005-287159 needs to further reduce the length of the base plate in its lateral direction. However, it is not easy to meet such a requirement. In the case of the shutter device shown, for example, in FIGS. 1-3 of Kokai No. 2005-287159, the shutter blade (a shutter blade 10 in Kokai No. 2005-287159) operated in about the lateral direction of the shutter base plate must be configured into a further elongate shape of narrow width in order to meet the requirement.

However, in the case where the shutter device is constructed as mentioned above, when two shutter blades close the opening for the photographing optical path, the amount of overlapping of the shutter blades becomes small and light leakage is caused from among these overlapping portions. In order to prevent such light leakage, it is only necessary to sufficiently ensure the amount of over-lapping of the shutter blades as a conventional way. When the shutter device is constructed in this way, however, the shutter blade (the shutter blade 10) operated in about the lateral direction actually causes the rotational motion, and thus the amount of overlapping of a part of its top side on the opposite side of the closing direction and the peripheral part of the opening for the photographing optical path ceases to be obtainable. In addition, clearances are produced among those, as the case may be. As a result, the light leakage is caused from among the overlapping portions or from the clearances.

It is, therefore, an object of the present invention to provide a blade driving device for cameras constructed so that a plurality of blades reciprocated by a driving means and introduced into, and removed from, the opening for the photographing optical path include a blade in which a part introduced into the opening exists in one of two region of the base plate in its longitudinal direction, with the opening between them, when the blade is removed from the opening, and another blade in which a part introduced into the opening exists in one of two regions of the base plate in its lateral direction, with the opening between them, wherein it is possible that the length of the base plate in the lateral direction is reduced and base plate is made further elongate, compared with a conventional base plate.

In order to achieve the above object, the blade driving device for cameras according to the present invention comprises a base plate which has an opening for a photographing optical path to construct a blade chamber between a cover plate and the base plate, and in which a blade-chamber-side surface between one end in a longitudinal direction thereof and the opening is taken as a first region, the blade-chamber-side surface between the other end in the longitudinal direction and the opening is taken as a second region, and a surface on either side of the opening in a direction perpendicular to the longitudinal direction between the first region and the second region is taken as a third region; a driving means which has a driving pin giving a reciprocating operation in the blade chamber, mounted to a surface on the opposite side of the first region with respect to the base plate; a first blade rotatably mounted in the first region and introduced into, and removed from, the opening by the reciprocating operation of the driving pin so that when the first blade is removed from the opening, a part introduced into the opening exists practically in the first region; and a second blade slidably mounted in the first region and introduced into, and removed from, the opening simultaneously with the first blade by the reciprocating operation of the driving pin so that when the second blade is removed from the opening, a part introduced into the opening exists practically in the third region.

In this case, a third blade is rotatably mounted in the first region and the third blade is rotated simultaneously with the first blade and in the opposite direction of the first blade by the reciprocating operation of the driving pin and is introduced into, and removed from, the opening so that when the third blade is removed from the opening, a part introduced into the opening overlaps the part of the second blade introduced into the opening and exists practically in the third region. Whereby, it becomes possible that the length of the base plate in its lateral direction is further reduced.

In the blade driving device for cameras, when the second blade is designed so that it is slidably mounted in the first and second regions, the operation and static position of the slide member are stabilized. On the blade-chamber-side surface of the base plate, a thin plate member having an opening smaller than the opening of the base plate at a position where two openings overlap is mounted, and the blade chamber is constructed between the plate member and the cover plate. In the case where the opening of the plate member is designed as the opening for the photographing optical path, it becomes possible that the photographic lens is located close to the operation surfaces of the blades.

Moreover, the blade driving device for cameras can be used as a shutter device or a lens barrier device. However, when the first blade is designed so that to the part introduced into the opening for the photographing optical path has an opening smaller than the opening of the base plate, the blade driving device for cameras can be used as a stop device. In addition, when the first blade is designed so that an ND filter is mounted in such a way as to cover the opening configured smaller than the opening for the photographing optical path, it can be used as a filter device. The blade driving device for cameras of the present invention is advantageously used in each of cameras housed in various instruments as a device controlling the amount of received light of a solid-state image sensor, and hence the information terminals, such as mobile phones and PDAs, and vehicle mounted cameras also come into the category of the present invention.

In the present invention, the blade driving device for cameras is constructed so that the plurality of blades reciprocated by the driving means and introduced into, and removed from, the opening for the photographing optical path include a blade in which a part introduced into the opening exists in one of two regions of the base plate in its longitudinal direction, with the opening between them, when the blade is removed from the opening, and another blade in which a part introduced into the opening exists in one of two regions of the base plate in its lateral direction, with the opening between them. In this case, the former blade is rotated by the driving means like the conventional way, but the latter blade is constructed so that it is slid by the driving means. Consequently, the length of the base plate in the lateral direction can be reduced, compared with the conventional base plate, and compactness of the device is achieved, thus bringing about the effect that the number of degrees of camera design freedom is increased. When the latter blade is constructed so that it is divided into a blade to be slid and another blade to be rotated, its effect is further heightened.

BRIEF DESCRIPTION OF THE DRAWINGS

FIGS. 5A, 5B, and 5C are views of an example of a mobile phone incorporating the shutter device of Embodiment 1, showing a front view of the phone that is not used, a left side view of the phone of FIG. 5A, and a front view of the phone that is used, respectively.

BEST MODE FOR CARRYING OUT THE INVENTION

Figure 8:
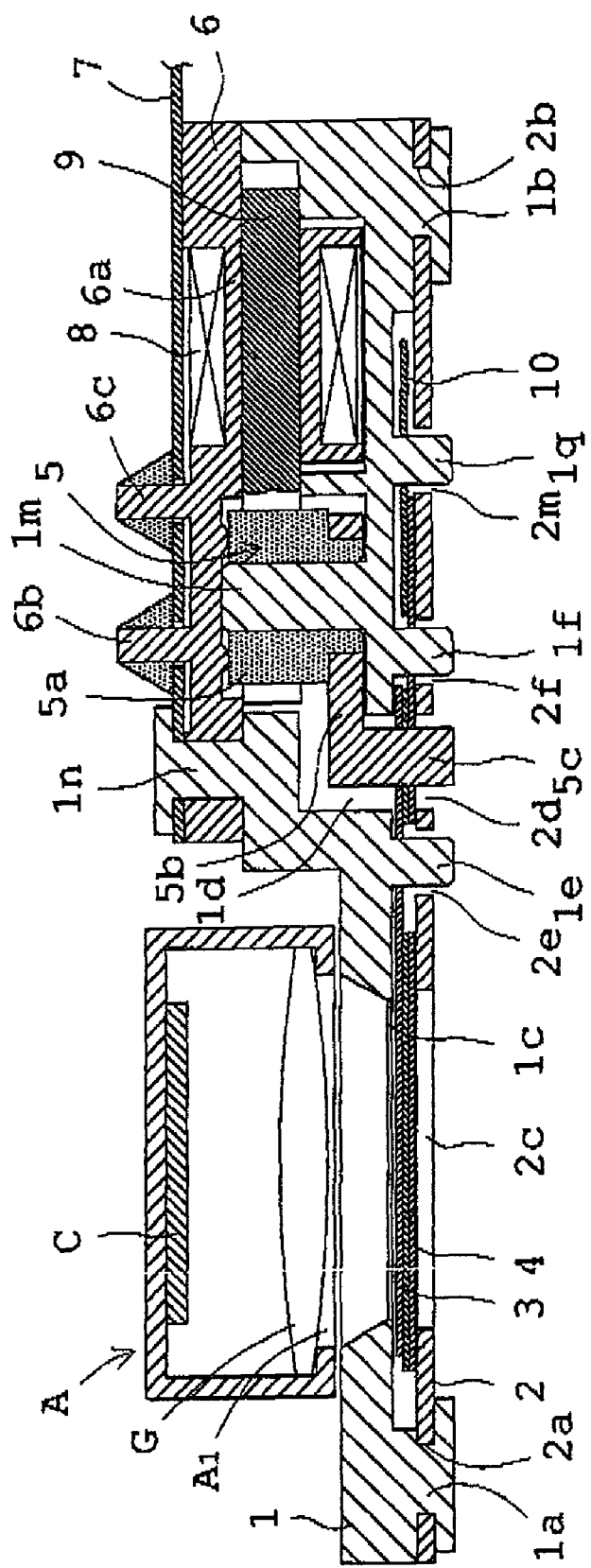
FIG. 8 is a sectional view showing the structure of Embodiment 2 to facilitate a comprehension thereof.
Figure 9:
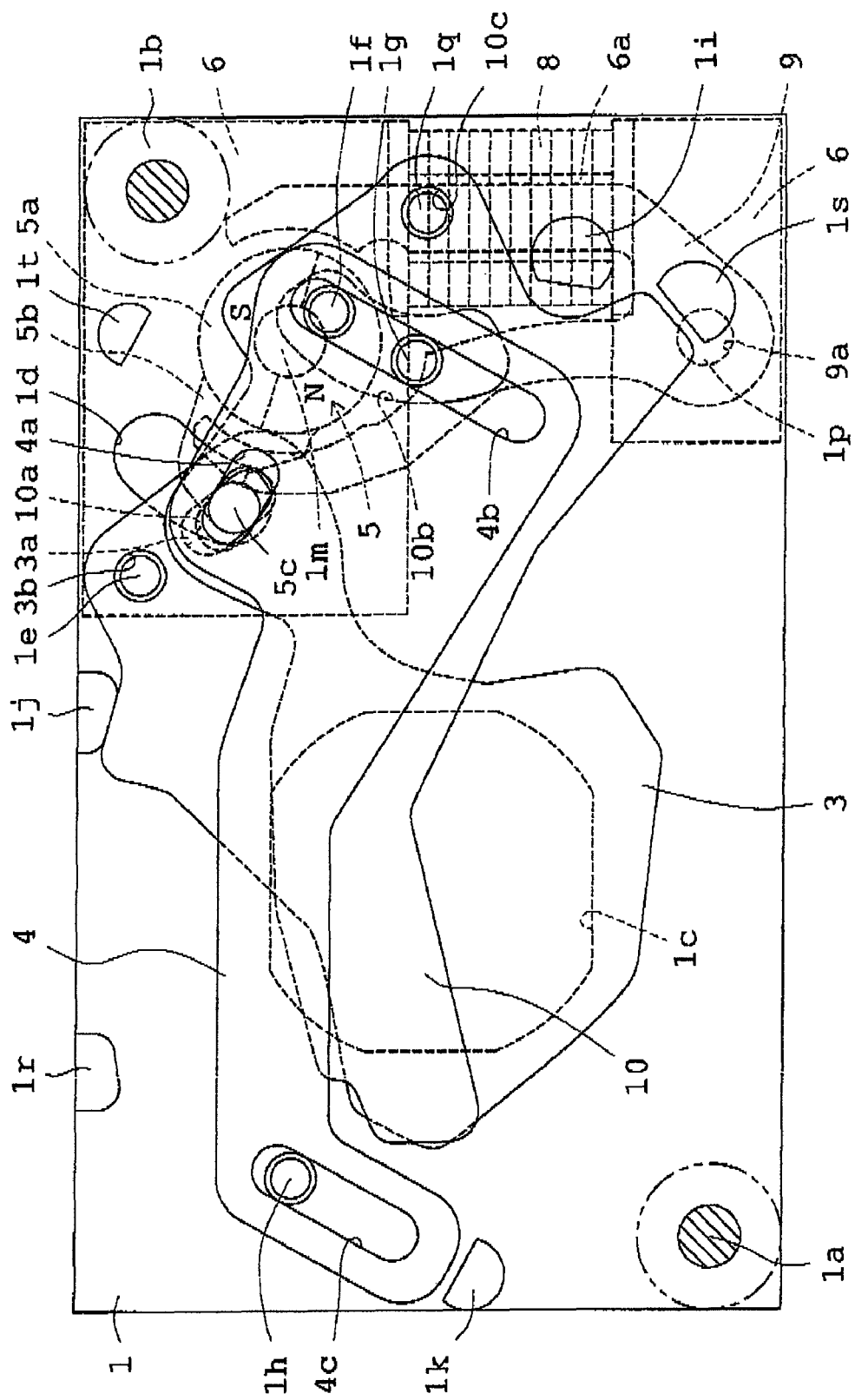
FIG. 9 is a plan view of Embodiment 2 showing the shutter blades brought into a closed state.
Figure 10:
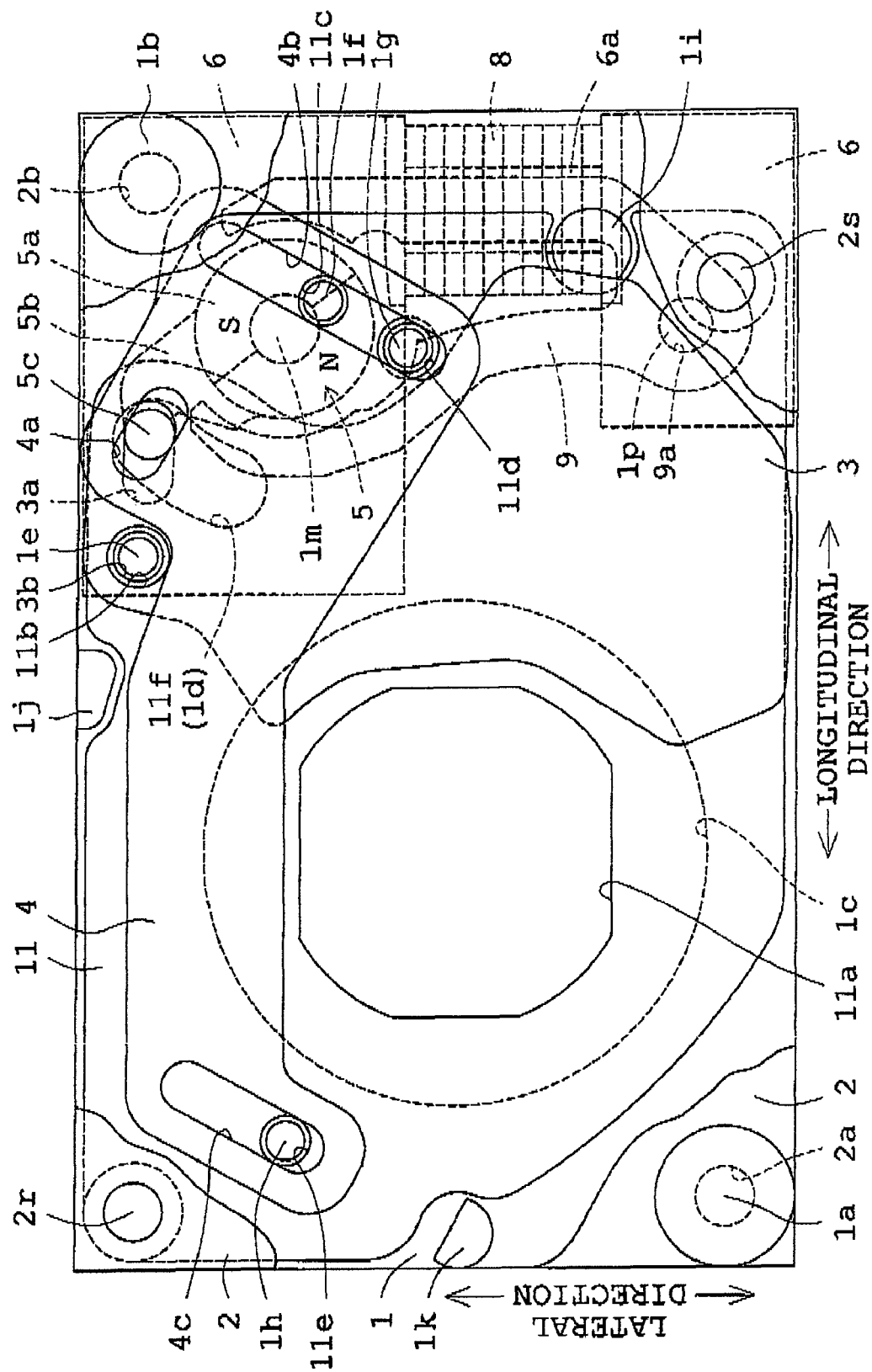
FIG. 10 is a plan view showing Embodiment 3 of the blade driving device for cameras according to the present invention where the shutter blades are brought into a fully opened state.
Figure 11:
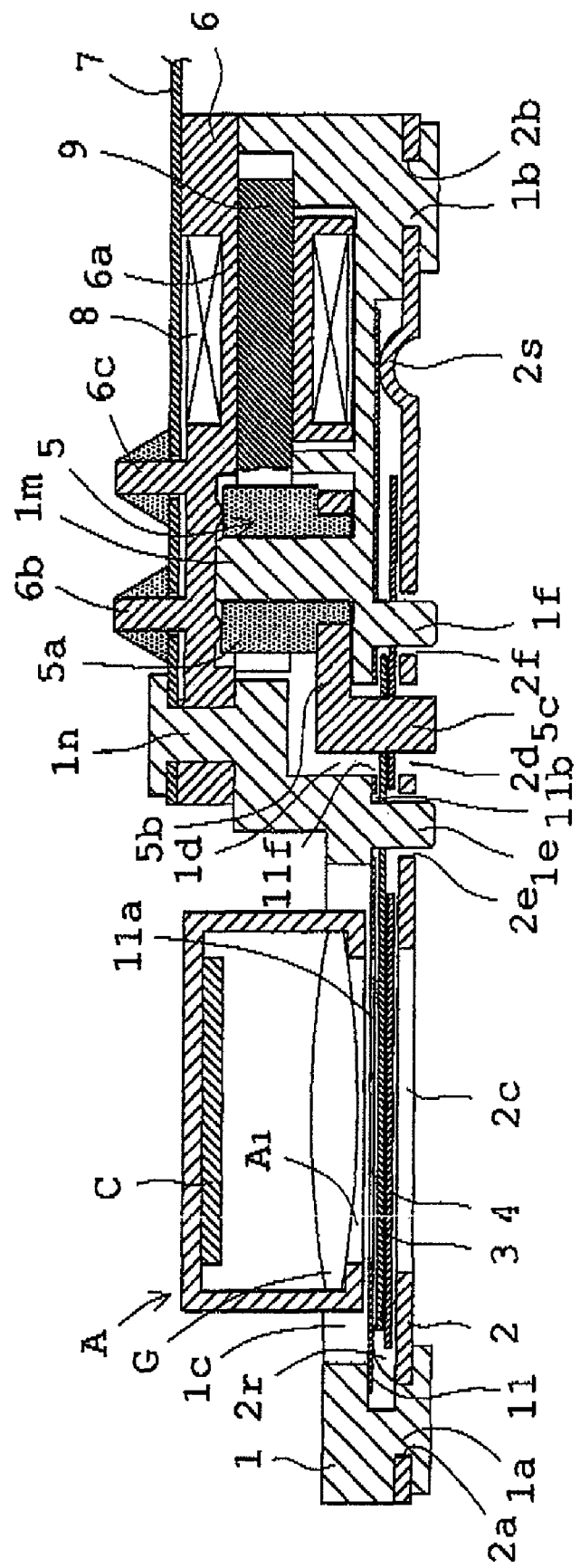
FIG. 11 is a sectional view showing the structure of Embodiment 3 to facilitate a comprehension thereof.
Figure 12:
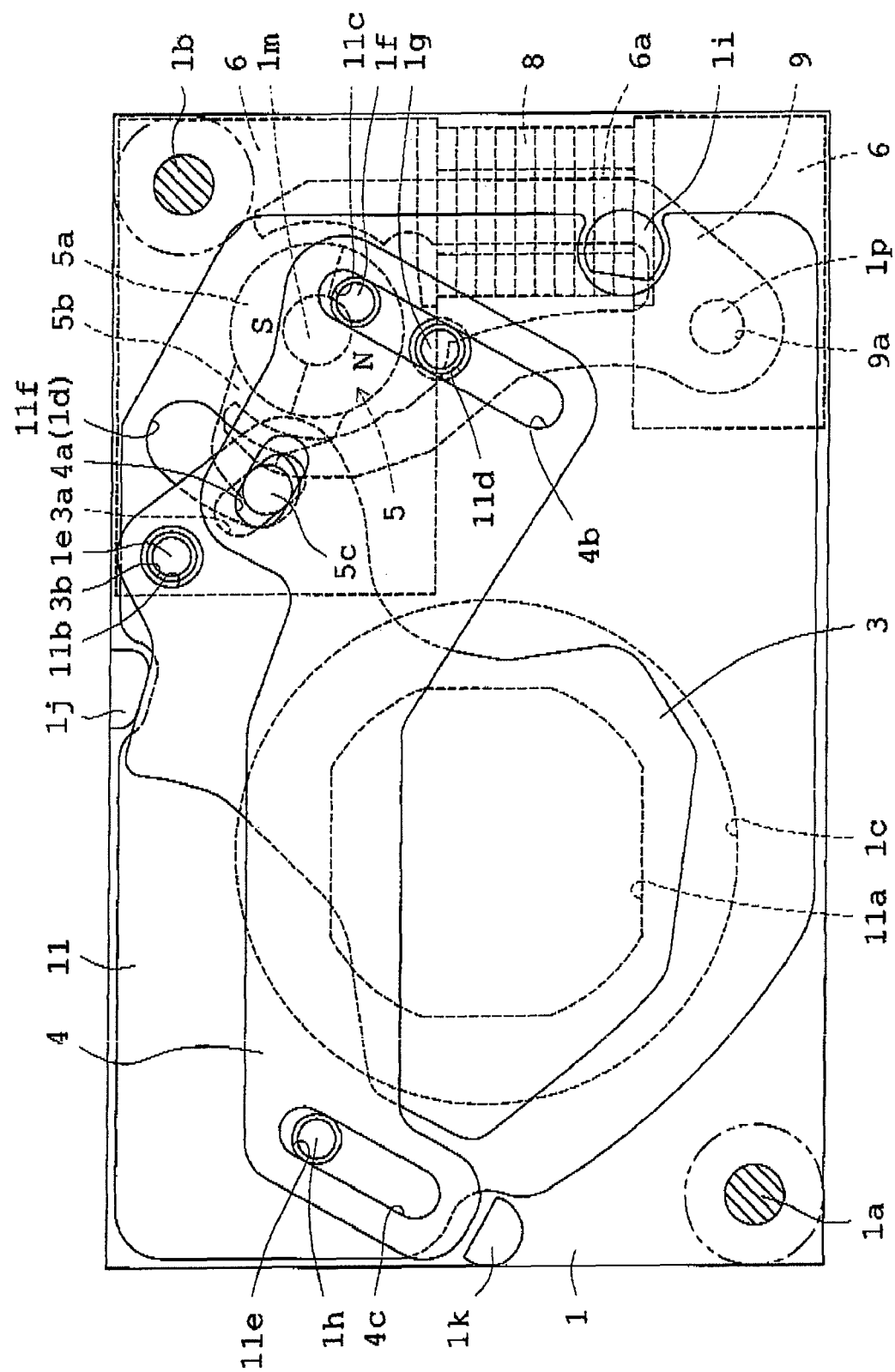
FIG. 12 is a plan view of Embodiment 3 showing the shutter blades brought into a closed state.
Figure 13:
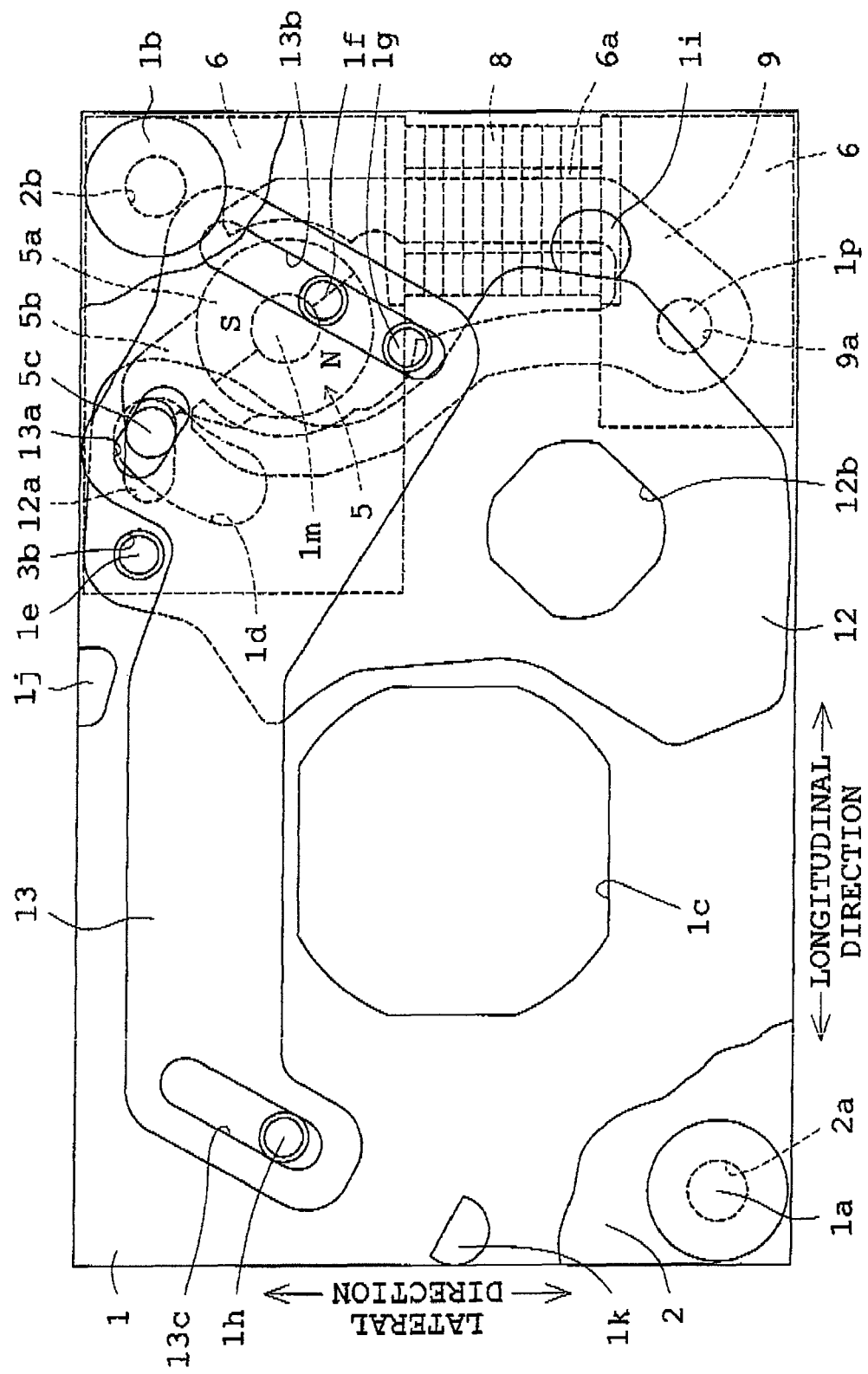
FIG. 13 is a plan view showing Embodiment 4 of the blade driving device for cameras according to the present invention where the stop blade is brought into a wait state.
Figure 14:
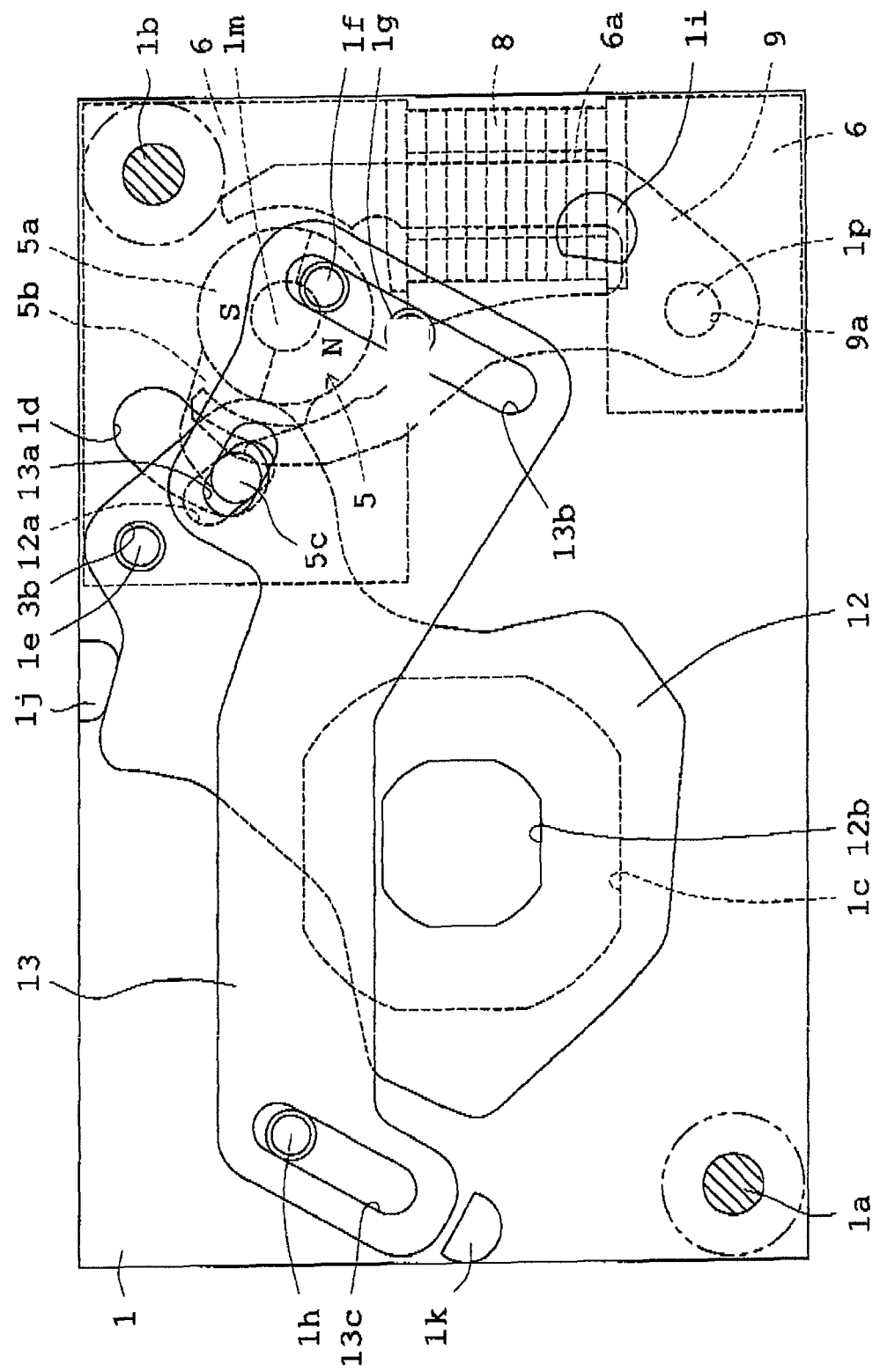
FIG. 14 is a plan view of Embodiment 4 showing the stop blade is brought into a use state.
Figure 15:
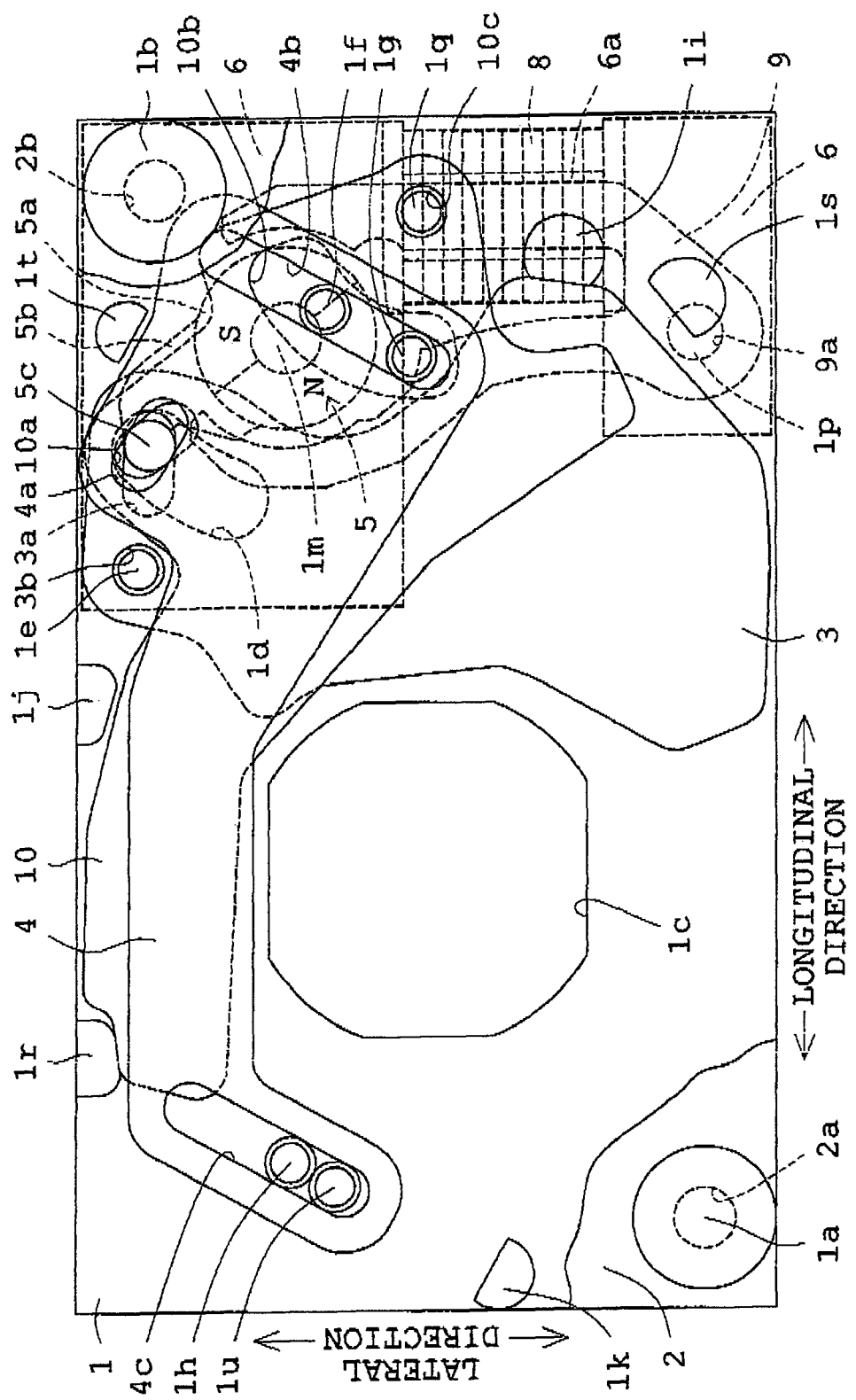
FIG. 15 is a plan view showing Embodiment 5 of the blade driving device for cameras according to the present invention where the shutter blades are brought into a fully opened state.
Figure 16:
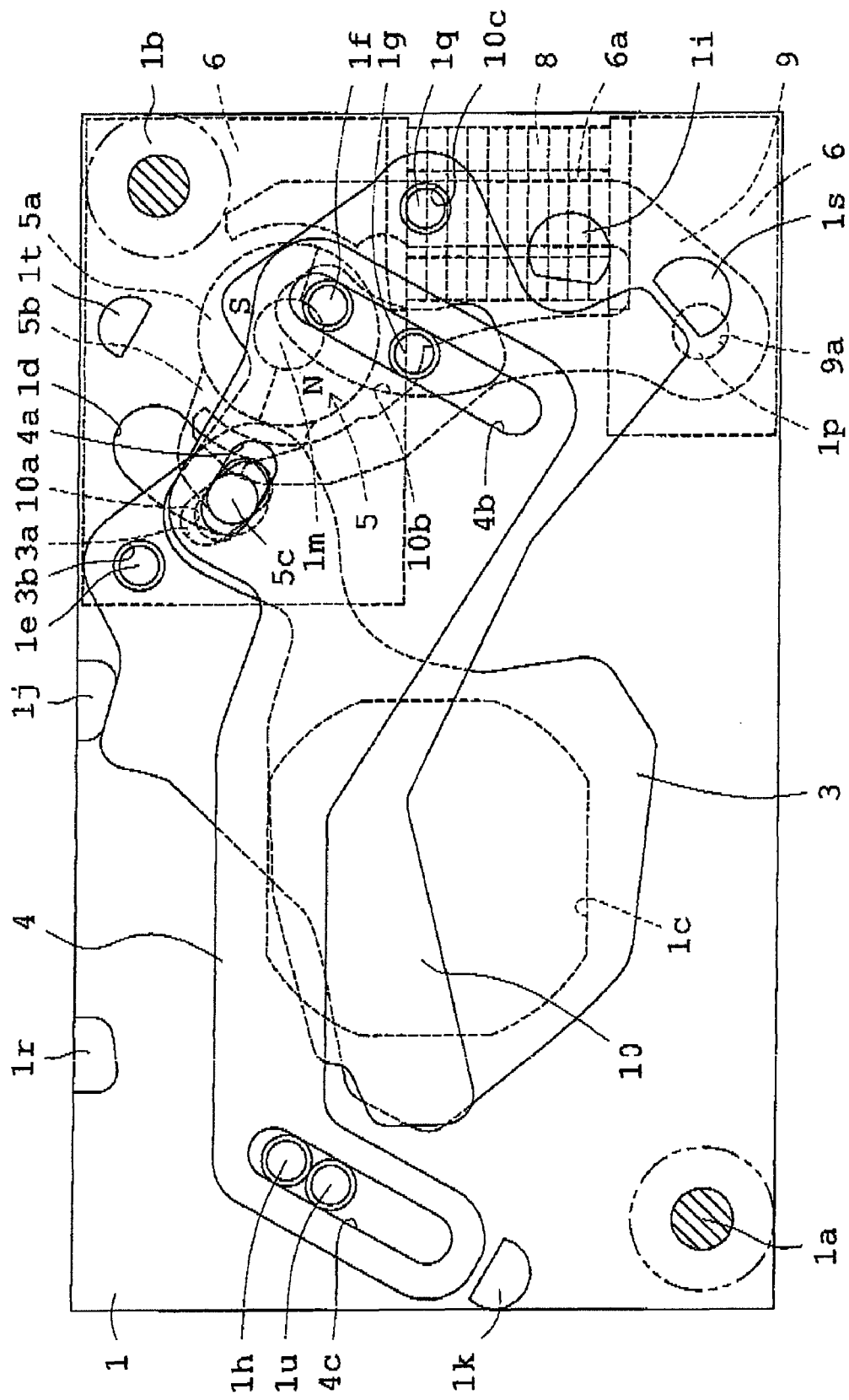
FIG. 16 is a plan view of Embodiment 5 showing the shutter blades brought into a closed state.

The present invention will be explained by five embodiments shown in the drawings. Of these embodiments, Embodiments 1-3 and 5 are constructed as the shutter device and Embodiment 4 is designed as the stop device. As mentioned above, however, it is also possible that, in addition to the above devices, the present invention is designed for the lens barrier device as well as for the filter device. As such, in the explanation of these embodiments, reference is occasionally made to the filter device and the lens barrier device. Also, FIGS. 1-5 are provided for the purpose of describing Embodiment 1, FIGS. 6-9 are for Embodiment 2, FIGS. 10-12 are for Embodiment 3, FIGS. 13 and 14 are for Embodiment 4, and FIGS. 15 and 16 are for Embodiment 5.

Embodiment 1

Figure 1:
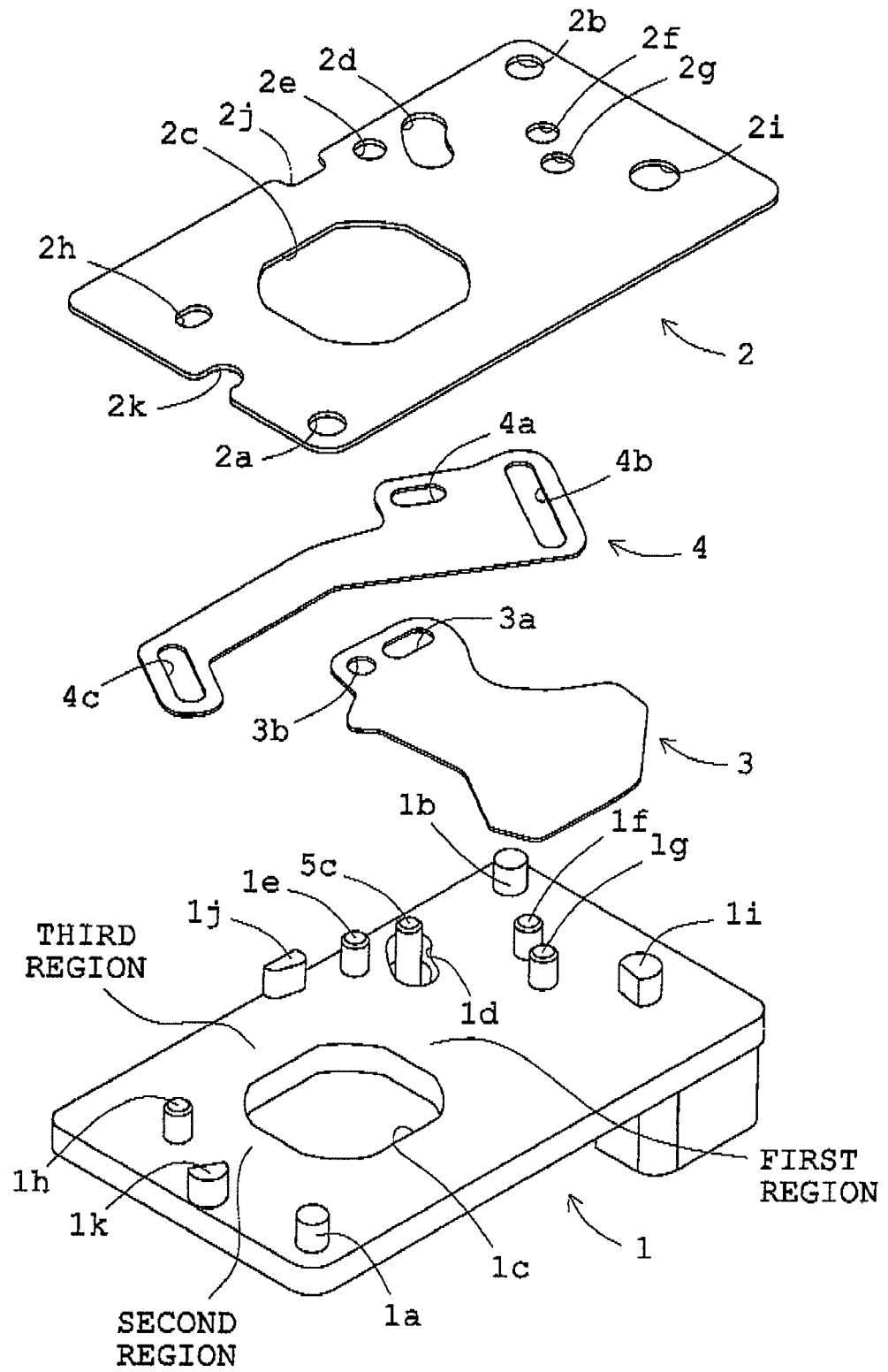
FIG. 1 is a perspective exploded view of Embodiment 1 showing the blade driving device for cameras according to the present invention.
Figure 2:
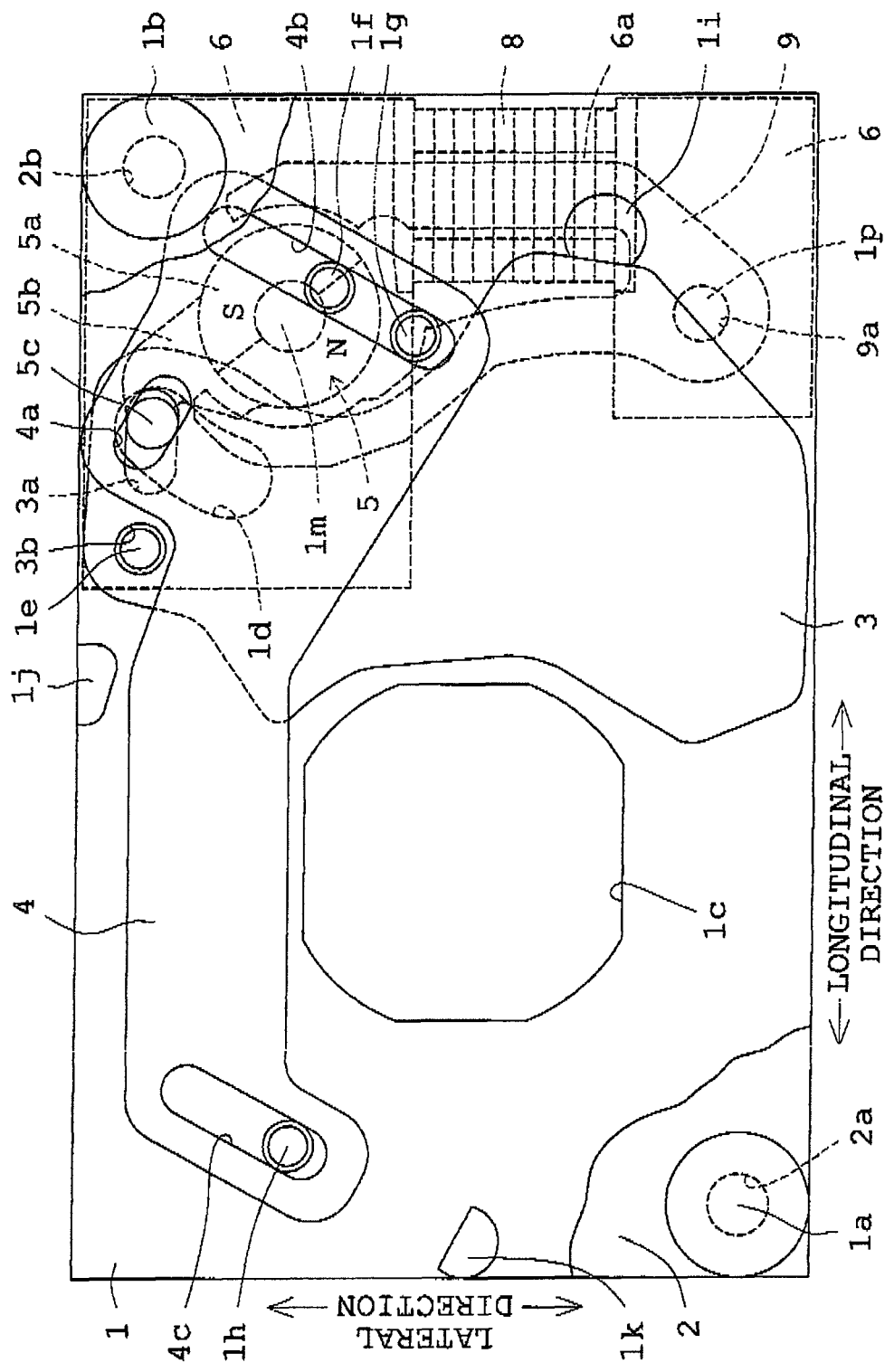
FIG. 2 is a plan view of Embodiment 1 showing the shutter blades brought into a fully opened state.
Figure 3:
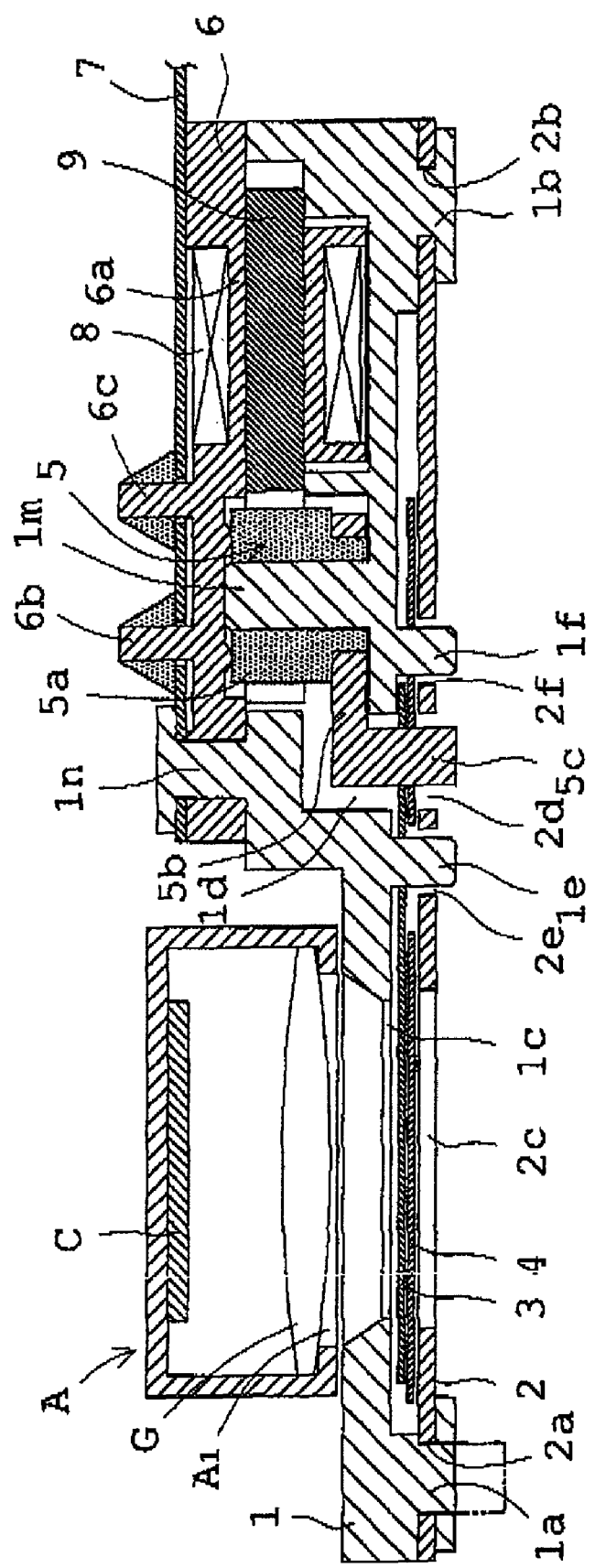
FIG. 3 is a sectional view showing the structure of Embodiment 1 to facilitate a comprehension thereof.
Figure 4:
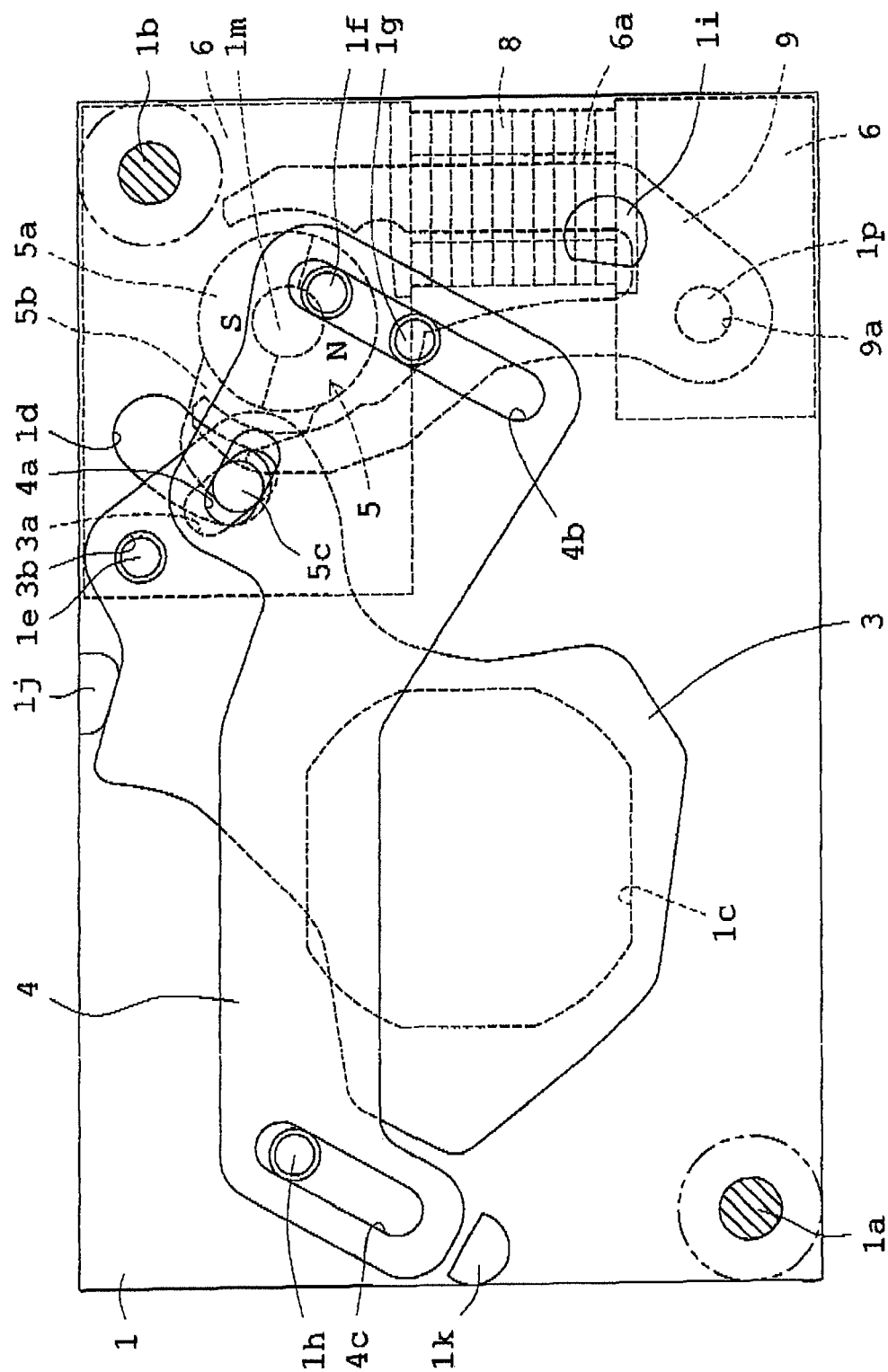
FIG. 4 is a plan view of Embodiment 1 showing the shutter blades brought into a closed state.

Embodiment 1 constructed as the shutter device will be described in accordance with FIGS. 1-5. FIG. 1 is a perspective exploded view showing the shutter device of the present embodiment. FIG. 2 is a plan view showing the shutter blades brought into a fully opened state inside the blade chamber, viewed from the cover plate side. FIG. 3 is a sectional view showing overlapping states of principal members shown in FIG. 2 to facilitate a comprehension of them. FIG. 4 is a plan view showing the shutter blades brought into a closed state in the same way as FIG. 2. FIGS. 5A, 5B, and 5C are views of an example of a mobile phone incorporating the shutter device of Embodiment 1, showing a front view of the phone that is not used, a left side view of the phone of FIG. 5A, and a front view of the phone that is used, respectively. Also, the shutter device of the present embodiment can be used in the digital camera and the film camera as well, but actually, is constructed on the premise that it is used in a camera for information terminals including the mobile phone. Hence, the present embodiment is described with respect to the case where the shutter device is used in the digital camera.

First, FIGS. 1-3 are mainly used to explain the structure of the present embodiment. A base plate 1 is made of synthetic resin and its planar shape is rectangular, but its both surfaces have complex shapes. A cover plate 2 mounting to the base plate 1 to constructed the blade chamber between the base plate 1 and the cover plate 2 is made of synthetic resin and its planar shape is almost the same as that of the base plate 1, but its both surfaces are flat. In FIG. 2, to facilitate a comprehension of the structure inside the blade chamber, only two parts (a part in a lower-left portion of the base plate 1 in FIG. 2 and a part of an upper-right portion of the base plate 1) mounted to the base plate 1 are shown. Also, the cover plate 2 is shown in the same way as the above description in FIGS. 7, 10, 13, and 15 used for the explanation of the following embodiments.

Reference is first made to a way of mounting the cover plate 2 to the base plate 1. Two cover plate mounting shanks 1a and 1b set upright on the base plate 1 has a cylindrical shape as shown in FIG. 1 before the cover plate 2 is mounted. In FIG. 3, the shape of the one cover plate mounting shank 1a in this case is indicated by a two-dot chain line. When the cover plate 2 is mounted to the base plate 1, the cylindrical cover plate mounting shanks 1a and 1b are first fitted into holes 2a and 2b, respectively, configured in the cover plate 2. Next, tips of the cover plate mounting shanks 1a and 1b are heat-resolved and deformed into a flange shape. By doing so, the mounting structure of the cover plate 2 shown in FIGS. 2 and 3 is obtained. Also, in FIG. 4, since the cover plate 2 is omitted from the figure, the shank portions of the cover plate mounting shanks 1a and 1b are shown by cross section and the outside to diameter of each of the flanges configured at the tips is indicated by the two-dot chain line. The cover plate mounting shanks 1a and 1b are shown in the same way as the above description in FIGS. 9, 12, 14, and 16 used for the explanation of the following embodiments.

As illustrated in FIG. 2, the base plate 1 is configured with an opening 1c for an object optical path on the left side of the middle in the longitudinal direction. Consequently, a region between the left end of the base plate 1 and the opening 1c is fairly smaller than that between the right end of the base plate 1 and the opening 1c, which is configured with an arcuate slot 1d. Further, the cover plate 2 is also configured with an opening 2c for the object optical path (refer to FIGS. 1 and 3) at a place opposite to the opening 1c and a slot 2d (refer to FIGS. 1 and 3) at a place opposite to the slot 1d.

Of these openings, the opening 2c has the shape similar to the opening 1c, but is somewhat larger than the opening 1c. Hence, the present embodiment is such that the photographing optical path is restricted by the opening 1c. Also, in the following description, the region between the right end of the base plate 1 in its longitudinal direction and the opening 1c is referred to as a first region. The region between the left end of the base plate 1 in the longitudinal direction is referred to as a second region. Further, the upper region, of regions on the both sides of the opening 1c, in a direction perpendicular to the longitudinal direction (which is hereinafter called a lateral direction) between the first region and the second region is referred to as a third region. In the description of the following embodiments, the same holds for these regions.

As shown in FIG. 1, four blade mounting shanks 1e, 1f, 1g, and 1h are set upright on the blade-chamber-side surface of the base plate 1 so that the tips of these shanks are inserted into holes 2e, 2f, 2g, and 2h, respectively, provided in the cover plate 2. In addition, three stoppers 1i, 1j, and 1k are set upright on the blade-chamber-side surface of the base plate 1. In the stopper 1i, its tip is inserted into a hole 2i provided in the cover plate 2, but in the stoppers 1j and 1k are inserted into notch holes 2j and 2k, respectively, provided at the edges of the cover plate 2.

In the blade chamber, two shutter blades 3 and 4 are arranged, with the shutter blade 3 on the base-plate-1 side. Of these shutter blades, the shutter blade 3 has a slot 3a and a round hole 3b and is constructed so that the hole 3b is fitted to the blade-mounting shank 1e set upright in the first region and thereby the shutter blade 3 is can be rotated. In a state of FIG. 2, the shutter blade 3 in such that a part to be introduced into the opening 1c exists in the first region. On the other hand, the shutter blade 4 has three slots 4a, 4b, and 4c and is constructed so that the slot 4b is fitted to the blade mounting shanks 1f and 1g set upright in the first region and the slot 4c is fitted to the blade mounting shank 1h set upright in the second region, and thereby the shutter blade 4 can be slid straight. In a state of FIG. 2, a part to be introduced into the opening 1c exists in the third region.

The base plate 1 is mounted with an electromagnetic actuator, as a driving means for the shutter blades 3 and 4, on the back side of the blade-chamber-side surface. This electromagnetic actuator is the one of the same kind as an electromagnetic actuator set forth in Japanese Patent Kokai No. 2005-287159. Subsequently, reference is made to the mounting structure of the electromagnetic actuator. As seen from FIG. 3, a rotor mounting shank 1m is set upright on the base plate 1 and a rotor 5 is rotatably mounted thereon. The rotor 5 includes a cylindrical body 5a constructed of a permanent magnet, an aim 5b molded out of synthetic resin, integrally with the body 5a and a driving pin 5c configured at the tip of the arm 5b. The driving pin 5c is inserted into the slot 1d of the base plate 1 and is fitted into the slot 3a and 4a of the shutter blades 3 and 4 inside the blade chamber so that its tip is inserted into the slot 2d of the cover plate 2. The body 5a is magnetized to have two poles in its radial direction. Also, the rotor 5 of the present embodiment is constructed as mentioned above, but like the rotor set forth in Kokai No. 2004-264467, it may be designed so that the arm 5b and the driving pin 5c are constructed of the permanent magnet, together with the body 5a.

A stator frame 6 shown in FIG. 3 is made of synthetic resin and is mounted to the base plate 1 at two places, together with a flexible printed-wiring board 7, but in FIG. 3, the mounting portion mounted, only at one place, to a stator frame mounting shank 1n is shown. Its mounting way is the same as that of the cover plate 2 relative to the base plate 1 and thus the explanation is omitted. The stator frame 6 has a hollow bobbin 6a and two terminal mounting pins 6b and 6c, which are inserted into respective holes provided in the flexible printed-wiring board 7. A coil 8 is wound around the bobbin 6a and its both ends are wound on the terminal mounting pins 6b and 6c and are soldered onto the flexible printed-wiring board 7.

A yoke 9 of the present embodiment, as seen from the FIG. 2, is shaped like the letter "U" so that the tops of two legs are constructed as magnetic pole sections and are opposite to the spherical surface of the rotor 5 in such a manner that the body 5a of the rotor 5 is interposed between them, and one of the legs is inserted into the bobbin 6a cylindrically configured in the stator frame 6. The yoke 9 is provided with a hole 9a, into which a positioning pin 1p of the base plate 1 is fitted. Also, any of the electromagnetic actuators of the present embodiment and the following embodiments has the structure mentioned above, but the driving means of the present invention is not limited to such a structure and may be a step motor.

Also, in FIG. 3, an imaging module A incorporated in the camera is illustrated together with the shutter blade driving device of the present embodiment. In the imaging module A, a photographic lens G is mounted inside an opening A1 and a solid-state image sensor C is provided in the back thereof so that the photographic lens G is made opposite to the opening $1c$ of the base plate 1. In this way, the imaging module A illustrated in FIG. 3 incorporates the photographic lens G and hence the shutter device is placed on the object side of the photographic lens G. The shutter device of the present embodiment, however, is not limited to this arrangement and may be arranged so that the base plate 1 is located on the object side and the cover plate 2 is located on the imaging-module-A side. Alternatively, between the solid-state image sensor C and the photographic lens G without providing the imaging module A, the base plate 1 or the cover plate 2 may be located on the solid-state-image-sensor-C side. This holds for the case of the blade driving device in each of the embodiments described below.

In this way, the shutter device of the present embodiment has the structure suitable for compact and slim designs. Hence, such shutter devices can be used in various cameras, and in particular, have the structures easily used in cameras for mobile phones. FIGS. 5A-5C show one example where the shutter device of the present embodiment is used in the camera for mobile phones and is placed in the mobile phone. FIG. 5A is a view showing the phone that is not used, viewed from the front. FIG. 5B is a view showing the phone of FIG. 5A, viewed from the left side of FIG. 5A, and FIG. 5C is a view showing the phone that is used, viewed from the front. Also, reference symbol S in these figures denotes the shutter device of the present embodiment and A denotes the imaging module A shown in FIG. 3.

Subsequently, the operation of the present embodiment will be explained. FIG. 2 indicates an initial state (a photographing wait state), in which the shutter blades 3 and 4 bring the opening $1c$ into a fully opened state and the power switch of the camera is in an on condition. Consequently, light from the object to be incident on the photographic lens passes through the opening $1c$ to strike the solid-state image sensor C, so that it becomes possible that a photographer observes an image of the object through a monitor. In this case, the coil 8 is not energized, but as is well known, the positional relationship between the magnetic pole of the body $5a$ of the rotor 5 and the magnetic pole sections of the yoke 9 causes the exertion of a magnetic attractive force so that a force for clockwise rotation is imparted to the rotor 5. In FIG. 2, therefore, a force for counterclockwise rotation is imparted to the shutter blade 3 by the driving pin $5c$ of the rotor 5 and a force for slide in an upper-right direction is imparted to the shutter blade 4. However, since the shutter blade 3 comes in contact with the stopper $1i$, this state is maintained.

When the release button of the camera is pushed in photography, electric charges stored in the solid-state image sensor C are discharged and photography is started by the store of new electric charges. Then, when proper exposure time passes, forward current is supplied to the coil 8 and the rotor 5 is rotated in the counterclockwise direction. Consequently, shutter blade 3 is rotated in the clockwise direction by the driving pin $5c$ and the shutter blade 4 is slid in the lower-left direction to close the opening $1c$. When the opening $1c$ is completely closed, the shutter blade 3, immediately after that, abuts on the stopper $1j$. In this case, since the shutter blade 3 is somewhat deflected and the fitting portion of the shutter blade 4 has tolerances, the shutter blade 4 may continue somewhat a sliding motion. However, the sliding motion is prevented by the fact that the shutter blade 4 abuts on the stopper $1k$, and finally the shutter blade 4 reaches a state shown in FIG. 4 and rests.

When the opening $1c$ is blocked in this way, imaging information stored as electric charges in the solid-state image sensor C is transferred to a memory in this state. When this transfer is completed, the reverse current, unlike the above description, is supplied to the coil 8. As such, the rotor 5 is rotated in the clockwise direction, the shutter blade 3 is rotated counterclockwise by the driving pin $5c$, and the shutter blade 4 is moved in the upper-right direction. When the opening $1c$ is then fully opened, the shutter blade 3, immediately after that, abuts on the stopper $1i$ and thereby the movements of the shutter blades 3 and 4 are stopped. When power to the coil 8 is disconnected, the shutter blades are restored to the initial state shown in FIG. 2.

In the case of the present embodiment, as seen from FIGS. 3 and 5B, the shutter blades 3 and 4 are arranged on the object side of the imaging module A. In other words, the shutter blades 3 and 4 are arranged on the object side of the photographic lens G. In the mobile phone, a transparent cover plate is generally attached in front of the shutter device. Thus, even when the shutter blades 3 and 4 bring the opening $1c$ into the fully opened state, external dust does not reach the photographic lens G. In the present embodiment, however, even though such a transparent cover plate is not attached, the shutter device can be designed so that the external dust does not reach the photographic lens G. That is, it is possible that the shutter device of the present embodiment is also used as the lens barrier device.

In the case of such use common between both, it is only necessary to operate the shutter device of the present embodiment as follows. First, in the initial state shown in FIG. 2, the shutter device is set previously set so that when the power switch of the camera is turned on, the forward current is supplied to the coil 8 only for preset time. Whereby, the shutter blades 3 and 4 block the opening $1c$ and thus the external dust does not reach the photographic lens G. Next, when the power switch of the camera is turned on in this state, the shutter device is previously set so that the reverse current is supplied to the coil 8 only for preset time. Whereby, the shutter blades 3 and 4 fully open the opening $1c$ to bring about the initial state of FIG. 2 and hence photography becomes possible.

In the ordinary camera, however, the photographic lens is often located on the object side of the shutter device. In such a case, when the shutter blades 3 and 4 are constructed to perform the opening and closing operation in front of (on the object side of) the photographic lens, the shutter device of the present embodiment becomes an exclusive-use lens barrier device. Hence, the lens barrier device constructed like the present embodiment is also the blade driving device for cameras of the present invention. This also holds for the cases of embodiments 2, 3, and 5 described below.

Also, the operation described above is explained in the case where the shutter device of the present embodiment is used in the digital camera. However, when the shutter device is used in the film camera, the closed state of the opening $1c$ shown in FIG. 4 becomes the initial state (the photographing wait state) so that when the release button is pushed in photography, the shutter blades 3 and 4 are moved to bring the opening $1c$ into a fully opened state shown in FIG. 2 and then are moved to restore the opening $1c$ into the closed state shown in FIG. 4.

The shutter blade 4 has the slots 4b and 4c, one for each of both ends in its longitudinal direction. This is because when the shutter blade 4 is constructed in this way, the operation of the shutter blade 4 is fairly stabilized. However, the two blade-mounting shanks 1f and 1g are fitted into the slot 4b and thus the slot 4c and the blade-mounting shank 1h need not necessarily be used. Further, even when another slot is provided in addition to the slot 4b, it is not provided farthest away from the slot 4b as in the slot 4c of the present embodiment, but may be provided adjacent to the slot 4b in the first region. In the case where the slots are constructed in this way, the shutter blade 4 requires the minimum length and hence it becomes possible that the length from the left end of the base plate 1 to the opening 1c is reduced in contrast with the present embodiment. The same holds for the blades to be moved in the following embodiments.

Moreover, the base plate 1 of the present embodiment has the rectangular shape, but the present invention is not limited to the plate whose all sides are straight. For example, the left side of the base plate 1 in FIG. 1 may be configured into an arcuate shape. In short, it is only necessary that the base plate of the present invention is elongate as a whole. In the present embodiment, the shutter blade 4 is located above the opening 1c as a whole in the fully opened state of the opening 1c shown in FIG. 2. The present invention, however, may be designed so that the shutter blades 3 and 4 may make an arrangement in which they are rotated by 180 degrees, with an axis in the longitudinal direction passing through the center (the optical axis) of the opening 1c as a center, without changing the mutual positional relationship of the shutter blades 3 and 4. In such a case, the blade-mounting shank 1e is set upright in the proximity of the lower portion of the base plate 1, and thus the shutter blade 3, when introduced into the opening 1c, is rotated in the counterclockwise direction. On the other hand, the shutter blade 4 is located below the opening 1c as a whole in a state where it is not introduced into the opening 1c. In such a case, therefore, the lower region of the opening 1c corresponds to the third region of the present invention. The same is true of the cases of the following embodiments.

Embodiment 2

Figure 6:
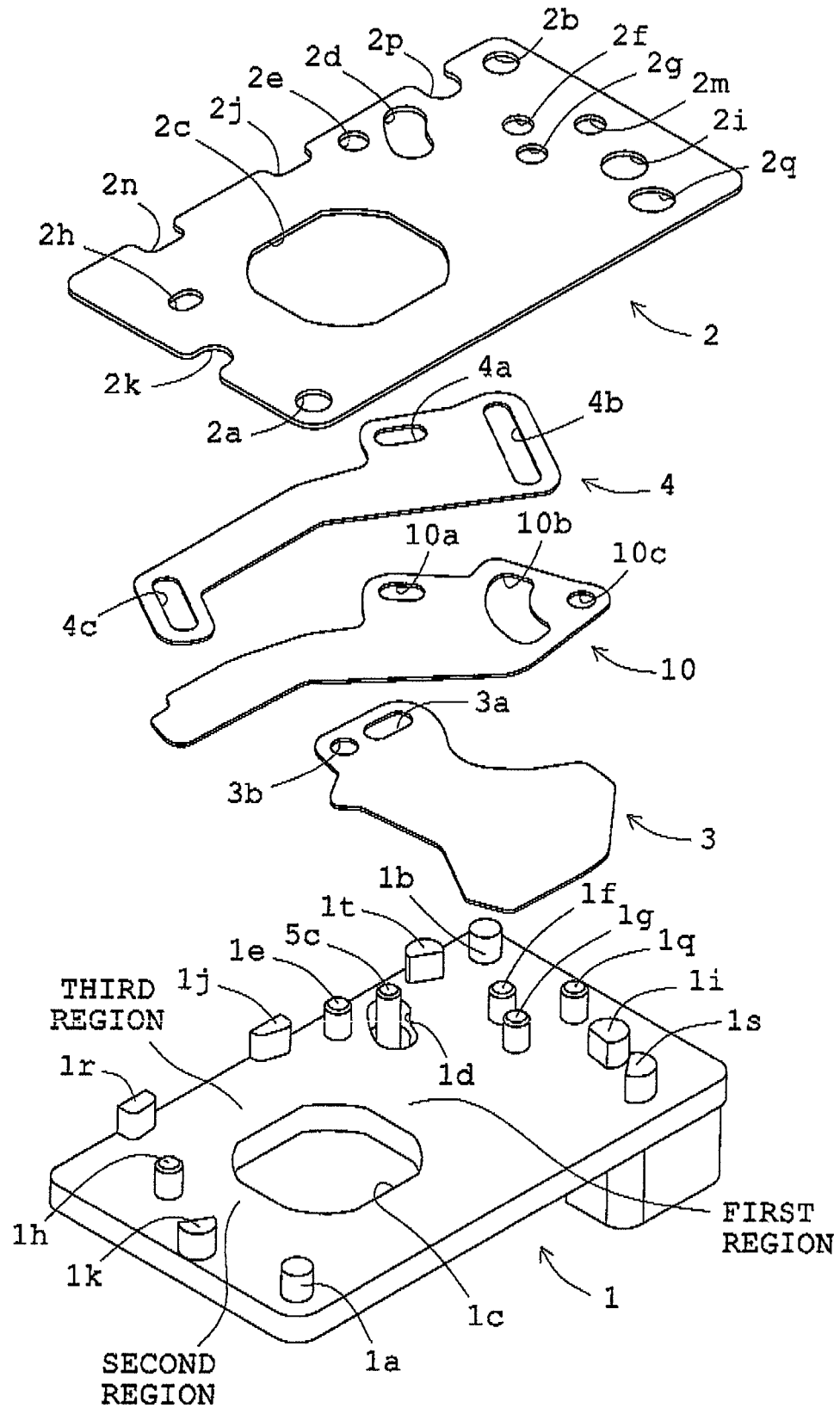
FIG. 6 is a perspective exploded view of Embodiment 2 showing the blade driving device for cameras according to the present invention.
Figure 7:
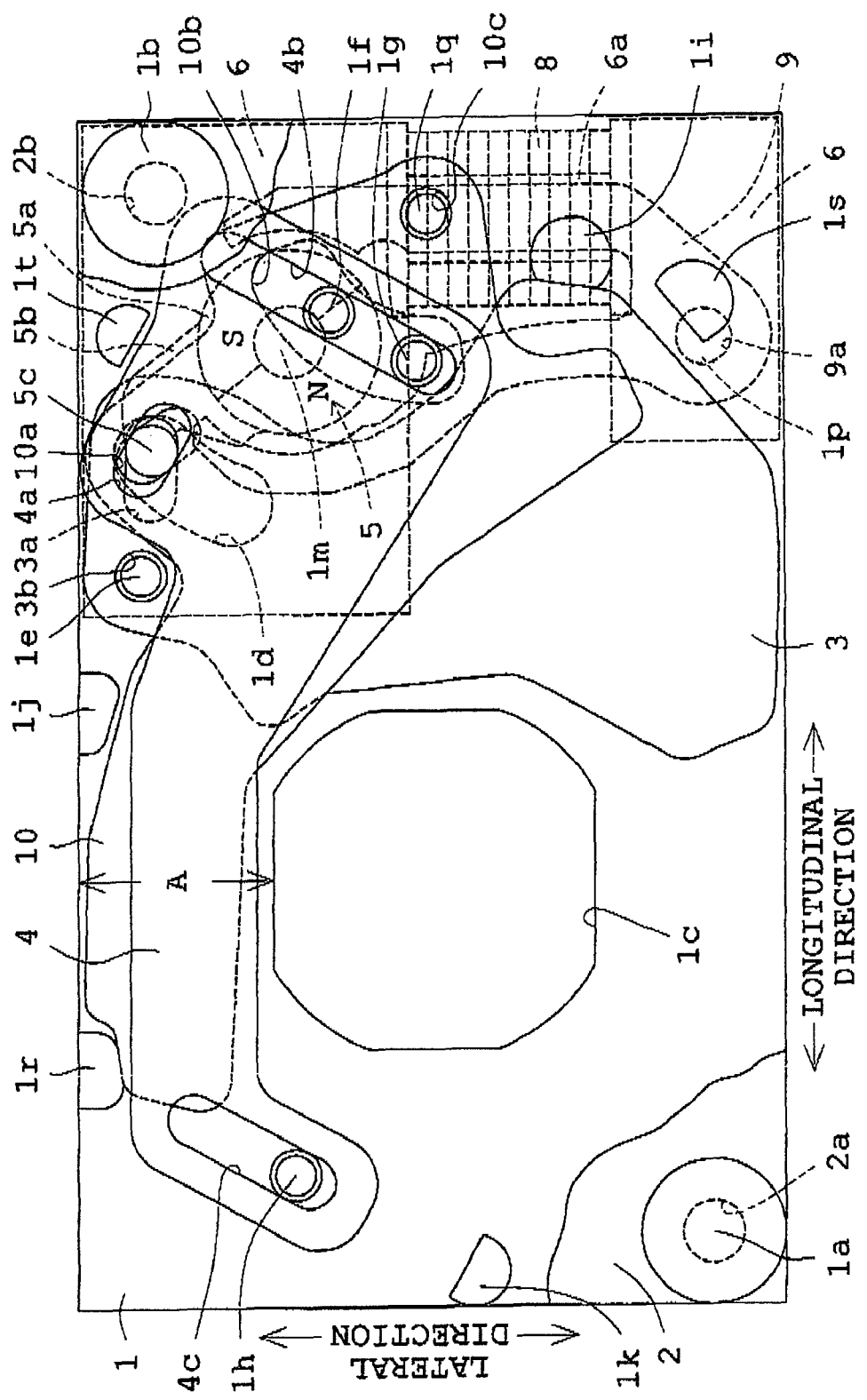
FIG. 7 is a plan view of Embodiment 2 showing the shutter blades brought into a fully opened state.

Subsequently, Embodiment 2 will be described in accordance with FIGS. 6-9. This embodiment is also constructed as the shutter device. FIG. 6 is a perspective exploded view showing the shutter device of the present embodiment. FIG. 7 is a plan view showing the shutter blades brought into a fully opened state in the blade chamber, viewed from the cover-plate side. FIG. 8 is a sectional view showing the overlapping state of main members in FIG. 7 to facilitate a comprehension thereof. FIG. 9 is a plan view showing shutter blades brought into a closed state in the same way as FIG. 7. Also, in the shutter device of the present embodiment, the number of shutter blades is only increased by one in contrast with the shutter device of Embodiment 2 and the other features are almost the same as in Embodiment 1. Hence, like reference numerals and symbols are used for substantially like members and parts in Embodiment 1, and in the following structural description, reference is made to only features different from those of Embodiment 1.

Reference is first made to the structure of the present embodiment. The base plate 1 of the present embodiment shown in FIG. 7 is configured so that the length from the left side to the right side in its longitudinal direction and the size and position of the opening 1c are the same as in Embodiment 1. However, a length A from the upper side to the opening 1c in its lateral direction is reduced, as compared with the case of Embodiment 1. The contour of the cover plate 2 of the present embodiment and the opening 2c also have shapes corresponding to the base plate 1. Consequently, the entire device is made slenderer and compacter than in Embodiment 1 and the number of degrees of design freedom of the single camera and the information terminal is increased in accordance with the slender and compact design.

In the blade chamber constructed between the base plate 1 and the cover plate 2, three shutter blades 3, 4, and 10 are arranged. Of these blades, the shutter blade 3 placed at the most base-plate-1-side position is somewhat smaller as a whole than the shutter blade 3 of Embodiment 1, but the way of mounting the shutter blade 3 to the base plate 1 is substantially the same. The shutter blade 4 placed at the most cover-plate-2-side position is smaller (slenderer) in vertical length than the shutter blade 4 of Embodiment 1. However, the way of mounting the shutter blade 4 to the base plate 1 is substantially the same.

In the present embodiment, a shutter blade 10 is interposed between these two shutter blades 3 and 4. The shutter blade 10 has two slots 10a and 10b and a circular hole 10c so that the hole 10c is fitted to a blade-mounting shank 1q set upright in the first region of the base plate 1, and is rotatably mounted. Although the slot 10a is fitted to the driving pin 5c of the rotor 5, the slot 10b is provided for the purpose of preventing interference with the blade-mounting shanks 1f and 1g during the operation. The shutter blade 4 is constructed to be straight slidable and thus is moved by the same amount as the amount of operation of the driving pin 5c. However, since the shutter blade 10 is rotated on the axis 1q, it is designed so that the speed of the part introduced into the opening 1c becomes higher than in the shutter blade 4. As for the rest, three stoppers 1r, 1s, and 1t are newly set upright on the base plate 1. Consequently, the cover plate 2, as shown in FIG. 6, is configured with a hole 2m into which the tip of the blade-mounting shank 1q is inserted, notch holes 2n and 2p into which the tips of the stoppers 1r and 1t are inserted, and a hole 2q into which the tip of the stopper 1s is inserted.

Other features are substantially the same as in Embodiment 1, but as seen from comparison of FIG. 7 with FIG. 2, the constituent member of the electromagnetic actuator is placed somewhat below, as compared with FIG. 2.

Subsequently, the operation of the present embodiment will be briefly explained. The present embodiment is also described with respect to the case where the shutter device is used in the digital camera. FIG. 7 indicates the initial state (the photographing wait state), in which the shutter blades 3, 4, and 10 bring the opening 1c into a fully opened state and the power switch of the camera is in an on condition. At this time, the coil 8 is not energized, but since, as is well known, a force for counterclockwise rotation is imparted to the rotor 5, a force for counterclockwise rotation is imparted to the shutter blade 3 by the driving pin 5c of the rotor 5, a force for movement in an upper-right direction is imparted to the shutter blade 4, and a force for clockwise rotation is imparted to the shutter blade 10. However, the shutter blade 3 comes in contact with the stopper 1i and the shutter blade 10 comes in contact with the stopper 1r, thereby maintaining a fixed state. In this initial state, the part of the shutter blade 10 introduced into the opening 1c overlaps the part of the shutter blade 4 introduced into the opening 1c and exists in the third region.

When the release button of the camera is pushed in photography, electric charges stored in the solid-state image sensor C are discharged and photography is started by the store of new electric charges. Then, when proper exposure time passes, forward current is supplied to the coil 8 by a signal from an exposure control circuit. Consequently, the rotor 5 is rotated in the counterclockwise direction, the shutter blade 3 is rotated in the clockwise direction by the driving pin 5*c*, the shutter blade 4 is slid in the lower-left direction, and the shutter blade 10 is rotated in the counterclockwise direction to close the opening 1*c*. When the opening 1*c* is completely closed, the shutter blade 3, immediately after that, abuts on the stopper 1*j*. In this case, since the shutter blade 3 is some-what deflected, the shutter blade 4, immediately after that, abuts on the stopper 1*k* and the shutter blade abuts on the stopper 1*s*. Finally, the shutter blades rest in a state shown in FIG. 9.

As will be seen from FIG. 9, when the distance from the upper side of the base plate 1 to the opening 1*c* in the lateral direction is reduced, the position of the blade-mounting shank 1*e* is shifted below, as compared with Embodiment 1, and the size of the shutter blade 3 becomes somewhat small. Hence, an area that the opening 1*c* cannot be covered by only the shutter blade 3 becomes larger than in Embodiment 1. As a result, when an attempt is made to completely ensure the amount of overlapping of the shutter blades 3 and 10, a region that cannot be covered by only the shutter blade 3 ceases to be covered by only the shutter blade 10.

In another view, when an attempt is made to completely ensure the amount of overlapping of the shutter blades 3 and 4 and the amount of overlapping of the shutter blade 10 and the periphery of the opening 1*c*, it is said that the region that cannot be covered by only the shutter blade 3 ceases to be favorably covered by only the shutter blade 4. Thus, the present embodiment is designed so that the region that cannot be covered by only the shutter blade 3 is covered by the shutter blades 4 and 10. Whereby, the amount of overlapping of the shutter blades 3 and 10 can be completely ensured and the amount of overlapping of the shutter blades 4 and 10 can also be completely ensured so that, in addition to this, the amount of overlapping of the shutter blade 4 and the peripheral portion of the opening 1*c* can be completely ensured.

When the opening 1*c* is closed in this way, the imaging information stored in the solid-state image sensor C as electric charges is transferred to the memory in this closed state. When this transfer is completed, the reverse current, unlike the above description, is supplied to the coil 8. As such, the rotor 5 is rotated in the clockwise direction, the shutter blade 3 is rotated counterclockwise by the driving pin 5*c*, the shutter blade 4 is moved in the upper-right direction, and the shutter blade 10 is rotated in the clockwise direction. When the opening 1*c* is then fully opened, the shutter blade 3, immediately after that, abuts on the stopper 1*i* and the shutter blade 10 abuts on the stopper 1*r*. In this case, since the shutter blades 3 and 10 are some-what deflected, the shutter blade 4, immediately after that, abuts on the stopper 1*t*. Finally, the shutter blades rest in a state shown in FIG. 9. When power to the coil 8 is disconnected, the shutter blades are restored to the initial state.

Embodiment 3

Subsequently, Embodiment 3 will be explained in accordance with FIGS. 10-12. This embodiment is also constructed as the shutter device. FIG. 10 is a plan view showing a fully opened state of the shutter blades in the blade chamber, viewed from the cover plate side. FIG. 11 is a sectional view showing the overlapping state of main members in FIG. 10 to facilitate a comprehension thereof. FIG. 12 is a plan view showing shutter blades brought into a closed state in the same way as FIG. 10. Also, in FIG. 10, the cover plate 2 is shown by only parts at four corners in order to facilitate the comprehension of the structure inside the blade chamber.

The shutter device of the present embodiment is such that a thin plate member 11 is newly provided in addition to the constituent members of Embodiment 1 and the opening for the photographing optical path is configured not in the base plate 1, but in the plate member 11. Consequently, although the shapes of the base plate 1 and the cover plate 2 in Embodiment 1 are partially changed, other constituent members are exactly the same as in Embodiment 1. In FIGS. 10-12, therefore, like reference numerals and symbols are used for like members and parts, and in the following structural description, reference is made to only features different from those of Embodiment 1.

The base plate 1 of the present embodiment illustrated in FIG. 10 has a rectangular shape which is exactly the same as in Embodiment 1. However, the opening 1*c* is circular and is fairly larger than that of Embodiment 1. The cover plate 2 of the present embodiment also has a rectangular shape which is exactly the same as in Embodiment 1 and the mounting structure of the cover plate 2 relative to the base plate 1 is also exactly the same. However, the cover plate 2 is configured with hemispherical projections 2*r* and 2*s* shown in FIG. 11 at upper-left and lower-right corner positions in FIG. 10. In the case of the present embodiment, the thin metallic plate member 11 is placed fairly close to the base plate 1 and the blade chamber is constructed between the plate member 11 and the cover plate 2.

The plate member 11 has an opening 11*a* for the photographing optical path of exactly the same shape as the opening 1*c* at exactly the same placement position as the opening 1*c* provided in the base plate 1 in Embodiment 1. The plate member 11 is configured with four circular holes 11*b*, 11*c*, 11*d*, and 11*e* into which the blade-mounting shanks 1*e*, 1*f*, 1*g*, and 1*h* are fitted, but, of these holes, the holes 11*c* and 11*e* are smaller in diameter than the holes 11*b* and 11*d*. Hence, the blade-mounting shanks 1*f* and 1*h* also serves as positioning pins where the plate member 11 is mounted to the base plate 1. Moreover, the plate member 11 is provided with a slot 11*f* of exactly the same shape at the position where it overlaps the slot 1*d* of the base plate 1. This plate member 11, as will be seen from FIG. 11, is made to maintain a contact state with the base plate 1 by the projections 2*r* and 2*s* of the cover plate 2.

The present embodiment is constructed as mentioned above and thereby, as shown in FIG. 11, a part of the imaging module A is inserted into the opening 1*c* of the base plate 1 so that the photographic lens G can be placed close to the operation surfaces of the shutter blades 3 and 4. Consequently, the shutter device is such that space in the camera can be effectively utilized accordingly. Also, the operation of the present embodiment is the same as in Embodiment 1 and thus its explanation is omitted.

Embodiment 4

Subsequently, Embodiment 4 will be explained in accordance with FIGS. 13 and 14. This embodiment is constructed as a stop device. FIG. 13 is a plan view showing the stop blades brought into a wait state in the blade chamber, viewed from the cover plate side. FIG. 14 is a plan view showing the stop blades brought into a worked state in the same manner as FIG. 13. In the stop device of the present embodiment, the shutter blade 3 of Embodiment 1 is constructed as a stop blade 12 and the shutter blade 4 of Embodiment 1 as an auxiliary blade 13. Other constituent members are exactly the same in shape and placement position as in Embodiment 1. Hence, in FIGS. 13 and 14, like reference numerals and symbols are used for like members and parts, and in the following structural description, reference is made to only features different from those of Embodiment 1.

In the present embodiment, the stop blade 12 and the auxiliary blade 13 are arranged, with the stop blade 12 on the base-plate-1 side, in the blade chamber. Besides taking exactly the same contour as the shutter blade 3 of Embodiment 1, the stop blade 12 has a slot 12a into which the driving pin 5c is fitted and an opening 12b for a stop configured in a region which does not overlap the auxiliary blade 13 and is rotatably mounted to the blade-mounting shank 1e. On the other hand, the auxiliary blade 13 takes exactly the same shape as the shutter blade 4 of Embodiment 1 and has a slot 13a into which the driving pin 5c is fitted, a slot 13b into which the blade-mounting shanks 1f and 1g are fitted, and a slot 13c into which the blade-mounting shank 1h is fitted so that the auxiliary blade 13 is guided by the blade-mounting shanks 1f, 1g, and 1h and can be moved straight.

Subsequently, the operation of the present embodiment will be explained. Also, in the stop device like the present embodiment, it is common practice to bring the opening 1c into a fully opened state before photography in the case where the stop device is used in the digital camera, as well as in the film camera. Hence, the operation of the present embodiment is explained in such a case. FIG. 13 indicates the initial state (the photographing wait state) of the present embodiment and the power switch of the camera is in the on condition. Although, in this case, the coil 8 is not energized, a force for clockwise rotation is imparted to the rotor 5. However, the stop blade 12 comes in contact with the stopper 1i and hence this state is maintained.

When the release button of the camera is pushed in photography, a determination is made as to whether light from the object should be attenuated or not to photograph in accordance with the result of photometry due to a photometric device. In the case of the determination that the light should not be attenuated to photograph, photography is performed in a state shown in FIG. 13 as it is, an the stop device is not entirely operated. In contrast to this, when it has been determined that the light should be attenuated to photograph, the forward current is supplied to the coil 8 and the rotor 5 is rotated in the counterclockwise direction. Consequently, the stop blade 12 is rotated in the clockwise direction by the driving pin 5c and the auxiliary blade 13 is moved in the lower-left direction so that individual blades are introduced into the opening 1c. When the center of the opening 12b of the stop blade 12 reaches the center position of the opening 1c, the stop blade 12 abuts on the stopper 1j and is somewhat deflected. Hence, the auxiliary blade 13 is such as to abut on the stopper 1k, but finally the stop blade 12 is restored to the original shape by its own restoring force and is fixed in a state shown in FIG. 14.

When the state shown in FIG. 14 is brought about in this way, photography is performed by the shutter device and the like. When the photography is completed, the reverse current, unlike the above description, is supplied to the coil 8. As a result, the rotor 5 is rotated in the clockwise direction and the stop blade 12 is rotated in the counterclockwise direction by the driving pin 5c so that the auxiliary blade 13 is slid in the upper-right direction. When the opening 1c is fully opened, the stop blade 12, immediately after that, abuts on the stopper 1i and the operation of the stop blade 12 and the auxiliary blade 13 is stopped. When the power to the coil 8 is disconnected, the blades are restored to the initial state in FIG. 14.

Also, the present embodiment is constructed as the stop device, but as is well known, when an ND filter plate is mounted in such a way as to cover the opening 12b with respect to the stop blade 12, the stop device changes to the filter device. Therefore, the filter device also comes into the category of the blade driving device of the present invention.

Embodiment 5

Subsequently, Embodiment 5 will be described in accordance with FIGS. 15 and 16. This embodiment is constructed as the shutter device. FIG. 15 is a plan view showing the shutter blades brought into a fully opened state in the blade chamber, viewed from the cover plate side. FIG. 16 is a plan view showing the shutter blades brought into a closed state in the same way as FIG. 15.

The shutter device of the present embodiment, unlike that of Embodiment 2, is designed to fit not only the single blade-mounting shank 1h into a slot 4c of the shutter blade 4, but also another blade-mounting shank 1u set upright on the base plate 1. Consequently, although the shapes of the base plate 1, the cover plate 2, and the shutter blade 4 in Embodiment 2 are partly changed, other constituent members are exactly the same as in Embodiment 2. Hence, in FIGS. 15 and 16, like reference numerals and symbols are used for like members and parts, and in the following structural description, reference is made to only features different from those of Embodiment 2.

In the base plate 1 of the present embodiment, the length from the left end to the opening 1c in the longitudinal direction is somewhat increased in contrast with the Embodiment 2. On the base plate 1, another blade-mounting shank 1u is set upright adjacent to the blade-mounting shank 1h at the lower-left position thereof, and the stopper 1k, in contrast with the case of Embodiment 2, is set upright at the lower-left position. The cover plate 2 of the present embodiment has a shape corresponding to the base plate 1, and the hole 2h in Embodiment 2 is configured into a shape in which tips of the two blade-mounting shanks 1h and 1u can be inserted. In addition, the slot 4c of the shutter blade 4 is made longer than in Embodiment 2 in order to fit the two blade-mounting shanks 1h and 1n. Thus, the length of the tip of the shutter blade 4 is also longer than in Embodiment 2.

Since the operation of the present embodiment is identical with the case of Embodiment 2, its explanation is omitted. In the present embodiment, however, the tip of the shutter blade 4 is guided by the two blade-mounting shanks 1h and 1u and hence the present embodiment, in contrast with Embodiment 2, is capable of stabilizing the operation of the shutter blade 4.

Also, the blade driving device for cameras in each of the above embodiments has been described on the premise that it is used in the camera of the information terminal such as the mobile phone. However, the blade driving device for cameras of the present invention has the structure suitable for the compact and slim design and thus can be used as the blade driving device, for example, in a vehicle mounted camera unit such as a rear-view camera for cars or a sensing camera used for a road lane recognition system or an automotive obstacle detection system. In the blade driving device of the present invention, it is possible to control the amount of light of the solid-state image sensor and to image the light, and hence the application to the vehicle mounted camera is advantageous.

INDUSTRIAL APPLICABILITY

The blade driving device for cameras of the present invention can be used in the single camera, the camera housed in the information terminal, such as the mobile phone, PDA, or PC, or a projection apparatus as the shutter device, the stop device, the filter device, or the lens barrier device, and is extremely useful for practical use.

The invention claimed is:

1. A blade driving device for cameras, comprising:
   a base plate which has an opening for a photographing optical path to construct a blade chamber between a cover plate and the base plate, and in which (i) a blade-chamber-side surface between one end in a longitudinal direction of the base plate and the opening is a first region, (ii) the blade-chamber-side surface between a remaining end in the longitudinal direction and the opening is a second region, and (iii) a surface on either side of the opening in a direction perpendicular to the longitudinal direction between the first region and the second region is a third region;
   driving means including a driving pin providing a reciprocating operation in the blade chamber, the driving means being mounted to a surface on an opposite side of the first region with respect to the base plate;
   a first blade rotatably mounted in the first region so as to be introduced into, and removed from, the opening by the reciprocating operation of the driving pin, such that, when the first blade is removed from the opening, a part of the first blade introduced into the opening exists in the first region; and
   a second blade slidably mounted in the first region so as to be introduced into, and removed from, the opening simultaneously with the first blade by the reciprocating operation of the driving pin, such that, when the second blade is introduced into the opening, the opening is completely closed by the first blade and the second blade, and such that, when the second blade is removed from the opening, a part of the second blade introduced into the opening exists in the third region.

2. The blade driving device for cameras according to claim 1,
   wherein a third blade is rotatably mounted in the first region and the third blade is rotated simultaneously with the first blade and in an opposite direction of the first blade by the reciprocating operation of the driving pin, and
   wherein the third blade is introduced into, and removed from, the opening such that, when the third blade is removed from the opening, a part of the third blade introduced into the opening overlaps the part of the second blade introduced into the opening and exists in the third region.

3. The blade driving device for cameras according to claim 1, wherein the second blade is slidably mounted in the first region and the second region.

4. The blade driving device for cameras according to claim 1,
   wherein a thin plate member is mounted on the blade-chamber-side surface of the base plate, the thin plate member having an opening smaller than the opening of the base plate at a position where the opening of the base plate and the opening of the thin plate member overlap, and
   wherein the blade chamber is constructed between the thin plate member and the cover plate, such that the opening of the thin plate member is the opening for the photographing optical path.

5. A blade driving device for cameras, comprising:
   a base plate which has an opening for a photographing optical path to construct a blade chamber between a cover plate and the base plate, and in which (i) a blade-chamber-side surface between one end in a longitudinal direction of the base plate and the opening is a first region, (ii) the blade-chamber-side surface between a remaining end in the longitudinal direction and the opening is a second region, and (iii) a surface on either side of the opening in a direction perpendicular to the longitudinal direction between the first region and the second region is a third region;
   driving means including a driving pin providing a reciprocating operation in the blade chamber, the driving means being mounted to a surface on an opposite side of the first region with respect to the base plate;
   a first blade rotatable mounted in the first region so as to be introduced into, and removed from, the opening by the reciprocating operation of the driving pin, such that, when the first blade is removed from the opening, a part of the first blade introduced into the opening exists in the first region; and
   a second blade slidably mounted in the first region so as to be introduced into, and removed from, the opening simultaneously with the first blade by the reciprocating operation of the driving pin, such that, when the second blade is removed from the opening, a part of the second blade introduced into the opening exists in the third region,
   wherein the first blade is configured such that the part of the first blade introduced into the opening for the photographing optical path has an opening smaller than the opening of the base plate.

6. The blade driving device for cameras according to claim 5, wherein the first blade is mounted with an ND filter so as to cover the opening that is smaller than the opening of the base plate.

7. The blade driving device for cameras according to claim 1, wherein it is possible to control an amount of light of a solid-state image sensor.

8. An information terminal provided with the blade driving device for cameras according to claim 7.

9. A vehicle mounted camera provided with the blade driving device for cameras according to claim 7.

10. The blade driving device for cameras according to claim 5, wherein the second blade is slidably mounted in the first region and the second region.

11. The blade driving device for cameras according to claim 5, wherein it is possible to control an amount of light of a solid-state image sensor.

* * * * *

UNITED STATES PATENT AND TRADEMARK OFFICE
CERTIFICATE OF CORRECTION

| | | |
|---|---|---|
| PATENT NO. | : 8,118,503 B2 | Page 1 of 1 |
| APPLICATION NO. | : 12/667127 | |
| DATED | : February 21, 2012 | |
| INVENTOR(S) | : Tomokazu Kihara et al. | |

It is certified that error appears in the above-identified patent and that said Letters Patent is hereby corrected as shown below:

In the drawings fig. 14, should be deleted and replaced with the following:

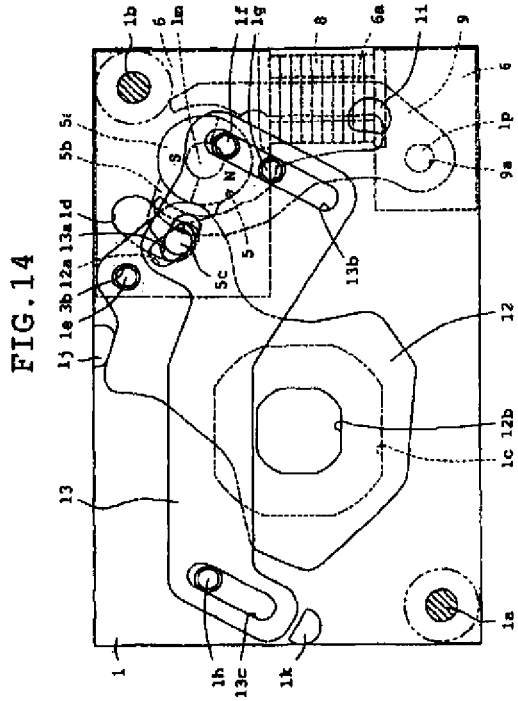

Signed and Sealed this
Twenty-fifth Day of September, 2012

David J. Kappos
*Director of the United States Patent and Trademark Office*